(12) United States Patent
Takahashi et al.

(10) Patent No.: US 10,230,871 B2
(45) Date of Patent: Mar. 12, 2019

(54) INFORMATION PROCESSING APPARATUS, CONFERENCE SUPPORT METHOD, AND RECORDING MEDIUM

(71) Applicant: Konica Minolta, Inc., Tokyo (JP)

(72) Inventors: Kenichi Takahashi, Osaka (JP); Katsuhiko Akita, Hyogo (JP); Kaitaku Ozawa, Hyogo (JP); Masami Yamada, Osaka (JP); Yuji Okamoto, Hyogo (JP); Yuki Asai, Hyogo (JP); Yasutaka Ito, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/440,542

(22) Filed: Feb. 23, 2017

(65) Prior Publication Data
US 2017/0244863 A1 Aug. 24, 2017

(30) Foreign Application Priority Data
Feb. 24, 2016 (JP) .................................. 2016-033113

(51) Int. Cl.
*G06F 3/12* (2006.01)
*H04N 1/44* (2006.01)
*H04N 1/00* (2006.01)

(52) U.S. Cl.
CPC ......... *H04N 1/444* (2013.01); *H04N 1/00392* (2013.01); *H04N 1/00511* (2013.01); *H04N 1/00514* (2013.01); *H04N 1/00931* (2013.01); *H04N 1/442* (2013.01); *H04N 1/4413* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 2005/0183035 A1* | 8/2005 | Ringel | G06F 3/0481 715/811 |
| 2009/0064285 A1* | 3/2009 | Takahashi | G06F 21/604 726/4 |
| 2014/0165152 A1* | 6/2014 | Farouki | H04N 7/15 726/4 |

FOREIGN PATENT DOCUMENTS

| JP | 2013-125551 A | 6/2013 |
| JP | 2013125551 A * | 6/2013 |

* cited by examiner

*Primary Examiner* — Huo Long Chen
(74) *Attorney, Agent, or Firm* — Osha Liang LLP

(57) ABSTRACT

An information processing apparatus to which a plurality of users can log in includes: a display unit configured to display an image; and a display controller configured to display personal region images corresponding to the respective users in a plurality of personal display regions at different positions in a display face of the display unit, display common images in the same common display region among the users in the display face of the display unit, and display images of data acquired on the authority to access of a corresponding user in the personal display regions to be movable, respectively, wherein when any of the users logs out, the display controller finishes displaying the image arranged in the personal display region among the data acquired on the authority to access of the user who logs out, and continues to display the image arranged in the common display region.

9 Claims, 21 Drawing Sheets

INFORMATION PROCESSING APPARATUS, CONFERENCE SUPPORT METHOD, AND RECORDING MEDIUM

CROSS-REFERENCE TO RELATED APPLICATION

The entire disclosure of Japanese Patent Application No. 2016-033113 filed on Feb. 24, 2016 including description, claims, drawings, and abstract are incorporated herein by reference in its entirety.

BACKGROUND

Field of the Invention

The present invention relates to an information processing apparatus, a conference support method, and a conference support program, and particularly to an information processing apparatus used for a conference by a plurality of users, a conference support method and a conference support program executed by the information processing apparatus.

Description of the Related Art

A plurality of users may discuss in a conference while browsing data owned by each of the users. As an information processing apparatus used for the conference, JP 2013-125551 A discloses an information processing apparatus including a touch panel display having an operation face and a display face, and a control unit which controls display of the touch panel display such that the desktop screen of each user is displayed with each outer frame of the panel of the touch panel display faced downward and a direction from the outer frame of the panel toward the center of the panel faced upward.

However, with the information processing apparatus described in JP 2013-125551 A, when any one of the logged-in users logs out of the information processing apparatus, the desktop screen of the user who logs out is not displayed, and the logged-in users cannot browse the data displayed on the desktop screen of the user who logs out.

SUMMARY OF THE INVENTION

One or more embodiments of the present invention provide an information processing apparatus for enabling a logged-in user to access data accessible by a user who logs out.

Further, one or more embodiments of the present invention provide a conference support method for enabling a logged-in user to access data accessible by a user who logs out.

Further still, one or more embodiments of the present invention provide a conference support program for enabling a logged-in user to access data accessible by a user who logs out.

According to an aspect, an information processing apparatus to which a plurality of users can log in comprises: a display unit configured to display an image; and a display control unit configured to display personal region images corresponding to the respective users in a plurality of personal display regions at different positions in a display face of the display unit, display common images in the same common display region among the users in the display face of the display unit, and display images of data acquired on the authority to access of a corresponding user in the personal display regions to be movable, respectively, wherein when any of the users logs out, the display control unit finishes displaying the image arranged in the personal display region among the data acquired on the authority to access of the user who logs out, and continues to display the image arranged in the common display region.

The information processing apparatus may further comprise an operation reception unit configured to receive a user operation, the display control unit may include a plurality of personal task execution units which correspond to a plurality of logged-in users, respectively, and which are directed for performing a processing only when a corresponding user is logging in, and a task control unit configured to control the personal task execution units, each of the personal task execution units may include a personal task image generation unit configured to generate a personal task image which includes the personal display region and the common display region for each of the users and in which an image of data acquired on the authority to access of a corresponding user is arranged in the personal display region, and a movement unit configured to move an image of data arranged in each of the personal display regions in the display face of the display unit on the basis of an operation received by the operation reception unit, and the task control unit may comprise a common image generation unit configured to, when any of the users logs out, generate a common image in which the image arranged in the personal display region among the images of the data acquired on the authority to access of the user who logs out is arranged in the common display region, and a combined screen display unit configured to display a combined screen in which one or more personal task images generated by one or more personal task execution units corresponding to one or more logged-in users among the personal task execution units are combined with the common image on the display unit.

The task control unit may further comprise a data acquisition unit configured to, when a user corresponding to any of the personal task execution units logs out, acquire data corresponding to an image moved to the common display region by the personal task execution unit of which a user corresponding to any of the personal task execution units logs out.

The task control unit may further comprise an authority setting unit configured to set an authority to restrain an access to the acquired data.

The task control unit may further comprise a restraint unit configured to restrain an access to the acquired data based on an operation received by the operation reception unit on the set authority, each of the personal task execution units may include a setting region display unit configured to display one or more authority setting regions corresponding to one or more authorities difference in restraint contents, respectively, in the common display region, and an authority determination unit configured to, when an image arranged in the personal display regions is moved by the movement unit to any of one or more authority setting regions, determine an authority corresponding to an authority setting region including a position to which the image is moved in the one or more authority setting regions for the data corresponding to the moved image, and the authority setting unit may set the authority determined by the data movement execution unit for the data acquired by the data acquisition unit.

The one or more authorities may include authorities different in restraint contents between before and after all the users log out.

The task control unit may further comprise a deletion unit configured to delete the acquired data when an effective period elapses after all the users log out.

The task control unit may further comprise a task-based data acquisition unit configured to acquire data corresponding to an image arranged in the personal display region by any of the personal task execution units, and the data acquisition unit may acquire the data acquired by the task-based data acquisition unit in order for the personal task execution unit of which a user corresponding to any of the personal task execution units logs out to arrange an image in the personal display region.

According to another aspect, a conference support method performed in an information processing apparatus to which a plurality of users can log in comprises the steps of: displaying personal task images corresponding to the respective users in a plurality of personal display regions at different positions in a display face of a display unit, and displaying common images in the same common display region among the users in the display face of the display unit; displaying images of data acquired on the authority to access of a corresponding user in the personal display regions to be movable, respectively; and when any of the users logs out, finishing displaying the image arranged in the personal display region among the data acquired on the authority to access of the user who logs out, and continuing to display the image arranged in the common display region.

Another aspect of the invention provides a non-transitory recording medium storing a computer readable conference support program which is executed by a computer for controlling an information processing apparatus to which a plurality of users can log in, and the program reflecting one aspect of the present invention causes the computer to perform the steps of: displaying personal task images corresponding to the respective users in a plurality of personal display regions at different positions in a display face of a display unit, and displaying common images in the same common display region among the users in the display face of the display unit; displaying images of data acquired on the authority to access of a corresponding user in the personal display regions to be movable, respectively; and when any of the users logs out, finishing displaying the image arranged in the personal display region among the data acquired on the authority to access of the user who logs out, and continuing to display the image arranged in the common display region.

BRIEF DESCRIPTION OF THE DRAWINGS

Various advantages and features of one or more embodiments of the present invention will become more fully understood from the detailed description given hereinbelow and the appended drawings which are given by way of illustration only, and thus are not intended as a definition of the limits of the present invention, and wherein.

DETAILED DESCRIPTION OF THE EMBODIMENTS

Figure 1:
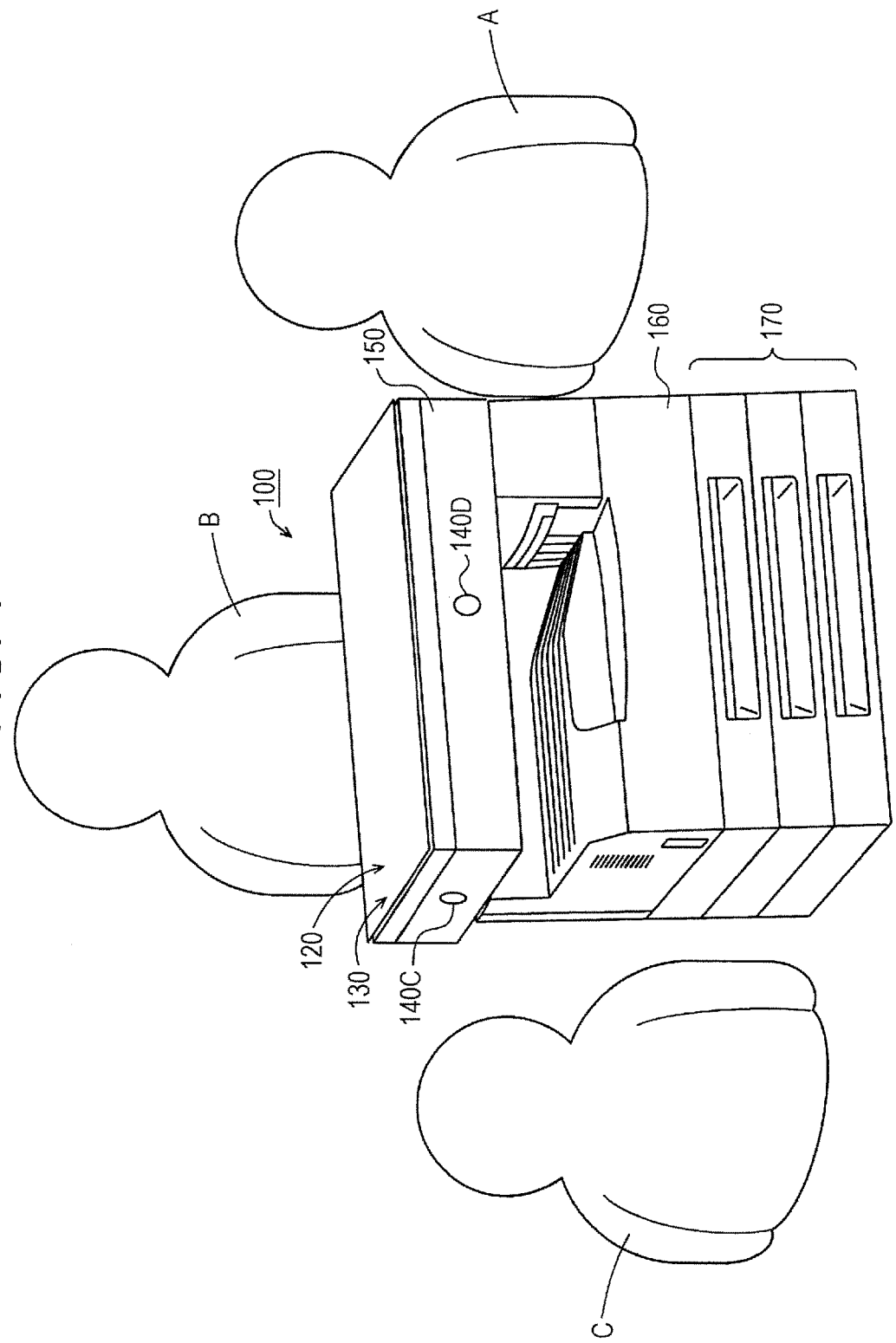
FIG. 1 is a perspective view illustrating an appearance of an MFP according to one or more embodiments of the present invention.

Hereinafter, embodiments of the present invention will be described with reference to the drawings. However, the scope of the invention is not limited to the illustrated examples. In the following description, the same parts are denoted with the same reference numerals. The same parts have the same names and functions. Thus, a detailed description thereof will not be repeatedly made.

Figure 2:
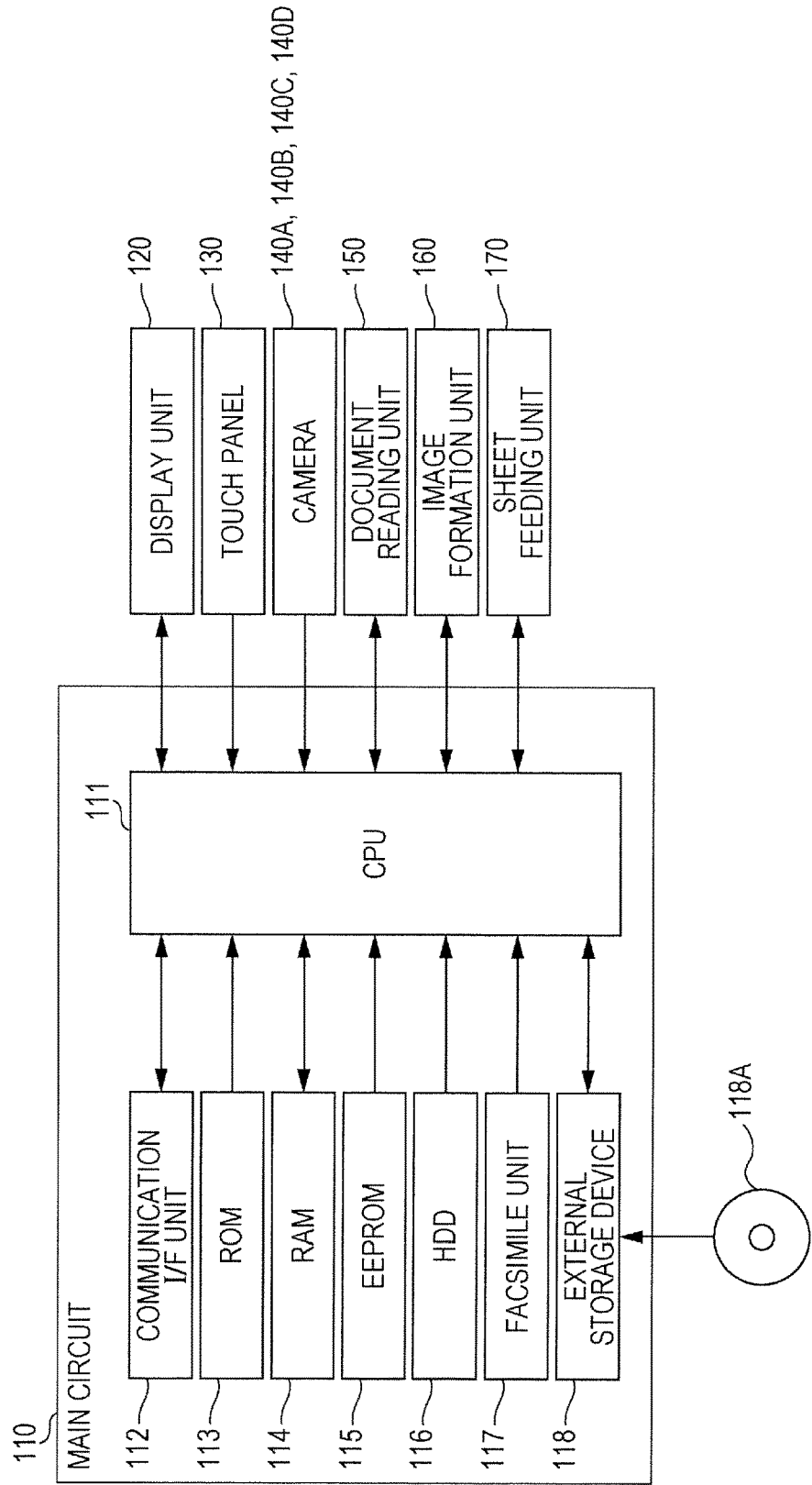
FIG. 2 is a block diagram illustrating an outline of a hardware configuration of the MFP according to one or more embodiments of the present invention.

FIG. 1 is a perspective view illustrating an appearance of an MFP according to one or more embodiments of the present invention. FIG. 2 is a block diagram illustrating an outline of a hardware configuration of the MFP. With reference to FIG. 1 and FIG. 2, an MFP (Multi Function Peripheral) 100 is an exemplary information processing apparatus, and includes a main circuit 110, a display unit 120, a touch panel 130, cameras 140A to 140D, a document reading unit 150 for reading a document, an image formation unit 160 for forming an image on a sheet or the like on the basis of image data of a document read and output by the document reading unit 150, and a sheet feeding unit 170 for feeding a sheet to the image formation unit 160.

The main circuit 110 includes a CPU (Central Processing Unit) 111, a communication I/F (Interface) unit 112, a ROM (Read Only Memory) 113, a RAM (Random Access Memory) 114, an EEPROM (Electrically Erasable and Programmable ROM) 115, a HDD (Hard Disk Drive) 116 as large-capacity storage device, a facsimile unit 117, and an external storage device 118 mounted with a CD-ROM (Compact Disk-ROM) 118A. The CPU 111 is connected to the display unit 120, the touch panel 130, the cameras 140A to 140D, the document reading unit 150, the image formation unit 160, and the sheet feeding unit 170, and controls the entire MFP 100. The various "units" within the main circuit or CPU as described herein are implemented by a circuit or the like.

The display unit 120 is a display device such as LCD (Liquid Crystal Display) or organic ELD (Electro-Luminescence Display). The display unit 120 is arranged on top of the MFP 100 main body with a display face on which an image is displayed faced upward. The display unit 120 is connected to the MFP 100 main body to be rotatable about one side of the display face, and is openable/closable. The document reading unit 150 is arranged below the display unit 120, and a reading face on which the document reading unit 150 reads a document is exposed while the display unit 120 is rotated and opened. The display unit 120 displays an image under control of the CPU 111.

The touch panel 130 is provided on the top face or bottom face of the display unit 120. The touch panel 130 detects a user-designated position in the display face of the display unit 120. The touch panel 130 outputs the coordinate of the detected position to the CPU 111.

The CPU 111 specifies a position in an image displayed on the display unit 120 based on the position in the display face of the display unit 120 detected by the touch panel 130 thereby to detect a user operation. For example, when a keyboard is displayed on the display unit 120, the CPU 111 detects an operation of designating a key entry when a position detected by the touch panel 130 is in the image of any key in the keyboard.

The cameras 140A to 140D are set at the four sides of the MFP 100 main body, respectively. Specifically, the camera 140A is installed at the left side of the MFP 100, the camera 140B is installed at the back side of the MFP 100, the camera 140C is installed at the right side of the MFP 100, and the camera 140D is installed at the front side of the MFP 100. The cameras 140A to 140D output image data obtained by shooting an object to the CPU 111.

The ROM 113 stores a program executed by the CPU 111, or data required for executing the program therein. The RAM 114 is used as a working area when the CPU 111 executes the program.

The communication I/F unit 112 is an interface for connecting the MFP 100 to a network. The CPU 111 makes communication with an information communication apparatus connected to a network via the communication I/F unit 112, and exchanges data therewith. Further, the communication I/F unit 112 can make communication with an information communication apparatus connected to the Internet via a network.

The facsimile unit 117 is connected to PSTN (public switched telephone network), and exchanges facsimile data therewith. The facsimile unit 117 converts image data read by the document reading unit 150 or data stored in the HDD 116 into facsimile data, and transmits it to a facsimile device connected to PSTN. Further, the facsimile unit 117 stores received facsimile data in the HDD 116 or causes the image formation unit 160 to form an image of the facsimile data on a sheet.

The external storage device 118 is mounted with the CD-ROM 118A. The CPU 111 can access the CD-ROM 118A via the external storage device 118. The CPU 111 can load and execute a program recorded in the CD-ROM 118A mounted on the external storage device 118 in the RAM 114. The programs executed by the CPU 111 are not limited to the programs recorded in the CD-ROM 118A, and a program stored in the HDD 116 may be loaded and executed in the RAM 114. In this case, other information communication apparatus connected to the network may rewrite the program stored in the HDD 116 in the MFP 100, or may add and write a new program. Further, the MFP 100 may download a program from other information communication apparatus connected to the network, and may store the program in the HDD 116. Such programs include not only a program directly executable by the CPU 111 but also a source program, a compressed program, or an encrypted program.

FIG. 1 illustrates an example in which three users of user A, user B, and user C who participate in a conference hold the conference by use of the MFP 100. The user A is positioned near the left side of the MFP 100, the user B is positioned near the back side of the MFP 100, and the user C is positioned near the right side of the MFP 100. In this case, the camera 140A outputs an image of the shot user A to the CPU 111, the camera 140B outputs an image of the shot user B to the CPU 111, and the camera 140C outputs an image of the shot user C to the CPU 111.

Figure 3:
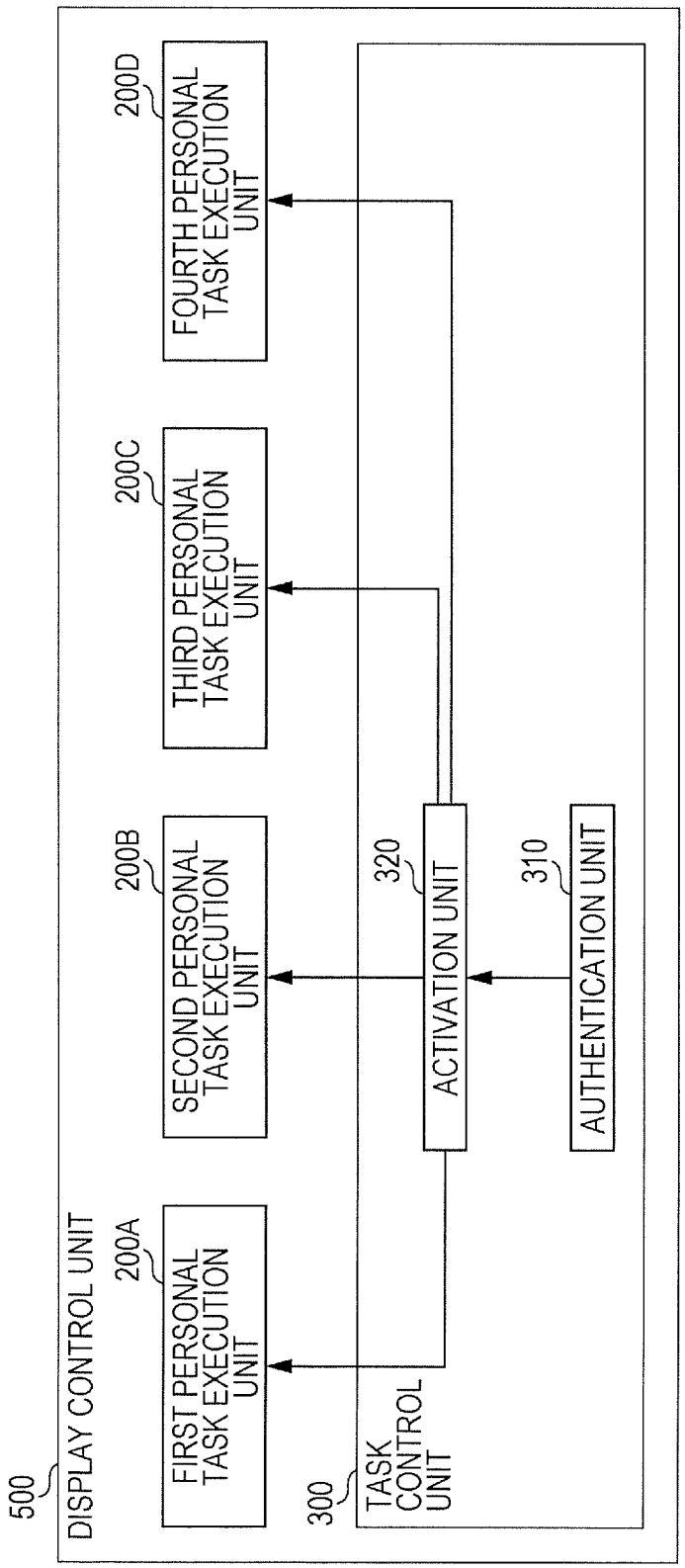
FIG. 3 is a diagram illustrating exemplary functions of a CPU provided in the MFP according to one or more embodiments of the present invention.

FIG. 3 is a diagram illustrating exemplary functions of the CPU provided in the MFP. The functions illustrated in FIG. 3 are the functions formed in the CPU 111 provided in the MFP 100 by the CPU 111 executing a conference support program stored in the ROM 113, the EEPROM 115, the HDD 116 or the CD-ROM 118A.

The CPU 111 includes a display control unit (controller) 500 with reference to FIG. 3. The display control unit 500 includes a task control unit (controller) 300. The task control unit 300 includes an authentication unit 310 and an activation unit 320. The authentication unit 310 authenticates a user, and determines a position of the authenticated user. The authentication unit 310 authenticates a user by face authentication on the basis of the images input from the cameras 140A to 140D. The MFP 100 previously stores the authentication information on users permitted to use the MFP 100 in the HDD 116. The authentication information is a pair of identification information for identifying a user and characteristic information extracted from an image of the shot user's face. The characteristic information includes information on a set of characteristic points configuring a shape of each site in the face image, color of each site, and the like. The authentication unit 310 makes face authentication by use of the characteristic information extracted from an image input from any of the cameras 140A to 140D, and the characteristic information included in the authentication information stored in the HDD 116. Specifically, when extracting a region expressing the face from an image input from the camera 140D, for example, the authentication unit 310 extracts the characteristic information from the extracted region, and authenticates a user specified by the user identification information included in the authentication information including the characteristic information matching with the extracted characteristic information when the authentication information including the characteristic information matching with the extracted characteristic information is stored in the HDD 116.

Further, when authenticating a user, the authentication unit 310 determines a position of the user on the basis of the position in which a camera shooting the authenticated user among the cameras 140A to 140D is arranged. When authenticating a user on the basis of an image output by the camera 140A, the authentication unit 310 determines a position of the authenticated user at the left side of the MFP 100, when authenticating a user on the basis of an image output by the camera 140B, the authentication unit 310 determines a position of the authenticated user at the back side of the MFP 100, when authenticating a user on the basis of an image output by the camera 140C, the authentication unit 310 determines a position of the authenticated user at the right side of the MFP 100, and when authenticating a user on the basis of an image output by the camera 140D, the authentication unit 310 determines a position of the authenticated user at the front side of the MFP 100. Thus, the number of users who are permitted to log in at the same time by the authentication unit 310 is four at maximum.

In the example illustrated in FIG. 1, the camera 140A shoots the user A, and thus the authentication unit 310 determines a position of the user A at the left side of the MFP 100 when authenticating the user A, the camera 140B shoots the user B, and thus the authentication unit 310 determines a position of the user B at the back side of the MFP 100 when authenticating the user B, and the camera 140C shoots the user C, and thus the authentication unit 310 determines a position of the user C at the right side of the MFP 100 when authenticating the user C. When authenticating a user, the authentication unit 310 outputs a pair of user identification information on the authenticated user and a detected position of the user to the activation unit 320.

The user authentication method by the authentication unit 310 may employ a different method from face authentication. For example, a user may be authenticated by use of an ID (Identification) card. In this case, a card reader for reading authentication information recorded in a user's own ID card is provided at each of the four sides of the MFP 100 instead of the cameras 140A to 140D. The authentication information herein is user identification information for identifying a user, for example. When an ID card is detected by any of the four card readers provided at the four sides, respectively, and the authentication information is read therefrom, the authentication unit 310 authenticates a user specified by the authentication information if the same authentication information as the read authentication information is stored in the HDD 116. Further, when authenticating a user, the authentication unit 310 detects a position of the user at the position in which the card reader reading the authentication information on the authenticated user is arranged among the four card readers provided at the four sides.

A log-in screen for receiving user authentication information may be displayed near each of the four sides of the display unit 120, a user may be authenticated on the basis of authentication information input into any of the four log-in screens, and a position of the authenticated user may be determined based on the position in which the log-in screen inputting the authentication information therein is displayed. The authentication information in this case is a pair of user identification information for identifying a user and password. The authentication unit 310 displays an image of the keyboard for receiving the user identification information and the password and the log-in screen together on the display unit 120, determines a user operation of inputting characters or numbers on the basis of a user-designated position detected by the touch panel 130 and a position of the image of the keyboard displayed on the display unit 120, and receives the user identification information and the password. When the same authentication information as the pair of user identification information and password received by any of the four log-in screens is stored in the HDD 116, the authentication unit 310 authenticates a user specified by the user identification information. When authenticating a user, the authentication unit 310 determines a position of the user on the basis of the position in which the log-in screen receiving the pair of user identification information and password among the four log-in screens is arranged.

Specifically, when the log-in screen receiving the pair of user identification information and password among the four log-in screens is arranged near the front side of the MFP 100 among the four sides of the display unit 120, a position of the authenticated user is determined at the front side of the MFP 100, when the log-in screen receiving the pair of user identification information and password is arranged near the right side of the MFP 100 among the four sides of the display unit 120, a position of the authenticated user is determined at the right side of the MFP 100, when the log-in screen receiving the pair of user identification information and password is arranged near the left side of the MFP 100 among the four sides of the display unit 120, a position of the authenticated user is determined at the left side of the MFP 100, and when the log-in screen receiving the pair of user identification information and password is arranged near the back side of the MFP 100 among the four sides of the display unit 120, a position of the authenticated user is determined at the back side of the MFP 100.

The display control unit 500 further includes a first personal task execution unit 200A, a second personal task execution unit 200B, a third personal task execution unit 200C, and a fourth personal task execution unit 200D. When a user is authenticated by the authentication unit 310, the activation unit 320 accordingly activates any of the first personal task execution unit 200A, the second personal task execution unit 200B, the third personal task execution unit 200C, and the fourth personal task execution unit 200D. The first personal task execution unit 200A, the second personal task execution unit 200B, the third personal task execution unit 200C, and the fourth personal task execution unit 200D are formed in the CPU 111 by the CPU 111 executing a personal task execution program.

The activation unit 320 is input with user identification information and user position of an authenticated user from the authentication unit 310. When the user position input by the authentication unit 310 indicates the left side of the MFP 100, the activation unit 320 activates the first personal task execution unit 200A, and outputs the user identification information and the user position to the first personal task execution unit 200A. When the user position input by the authentication unit 310 indicates the back side of the MFP 100, the activation unit 320 activates the second personal task execution unit 200B and outputs the user identification information and the user position to the second personal task execution unit 200B. When the user position input by the authentication unit 310 indicates the right side of the MFP 100, the activation unit 320 activates the third personal task execution unit 200C and outputs the user identification information and the user position to the third personal task execution unit 200C. When the user position input by the authentication unit 310 indicates the front side of the MFP 100, the activation unit 320 activates the fourth personal task execution unit 200D and outputs the user identification information and the user position to the fourth personal task execution unit 200D.

A personal display region and a common display region are defined for each of the first personal task execution unit 200A, the second personal task execution unit 200B, the third personal task execution unit 200C, and the fourth personal task execution unit 200D. The personal display regions defined for the first personal task execution unit 200A, the second personal task execution unit 200B, the third personal task execution unit 200C, and the fourth personal task execution unit 200D, respectively, do not overlap on each other. The common display regions defined for the first personal task execution unit 200A, the second personal task execution unit 200B, the third personal task execution unit 200C, and the fourth personal task execution unit 200D, respectively, overlap on each other. The first personal task execution unit 200A, the second personal task execution unit 200B, the third personal task execution unit 200C, and the fourth personal task execution unit 200D generate a personal task image to be displayed in the personal display region and the common display region, and perform a processing on the basis of a detected position when the touch panel 130 detects the position in the personal display region and the common display region.

The common display region is a rectangular region including the center of the display face of the display unit 120. The personal display region defined for the first personal task execution unit 200A is a rectangular region at the left side of the MFP 100 relative to the common display region in the display face of the display unit 120, the personal display region defined for the second personal task execution unit 200B is a rectangular region at the back side of the MFP 100 relative to the common display region in the display face of the display unit 120, the personal display region defined for the third personal task execution unit 200C is a rectangular region at the right side of the MFP 100 relative to the common display region in the display face of the display unit 120, and the personal display region defined for the fourth personal task execution unit 200D is a rectangular region at the front side of the MFP 100 relative to the common display region in the display face of the display unit 120.

For example, a description will be made assuming that the user A, the user B, and the user C are authenticated by the authentication unit 310 at the positions illustrated in FIG. 1. When the user A is authenticated by the authentication unit 310 at the left side of the MFP 100, the activation unit 320 activates the first personal task execution unit 200A and outputs the user identification information of the user A and the position of the user A as the left side to the first personal task execution unit 200A. When the user B is authenticated by the authentication unit 310 at the back side of the MFP 100, the activation unit 320 activates the second personal task execution unit 200B and outputs the user identification information of the user B and the position of the user B as the back side to the second personal task execution unit 200B. Further, when the user C is authenticated by the authentication unit 310 at the right side of the MFP 100, the activation unit 320 activates the third personal task execution unit 200C and outputs the user identification information of the user C and the position of the user C as the right side to the third personal task execution unit 200C.

The first personal task execution unit 200A, the second personal task execution unit 200B, the third personal task execution unit 200C, and the fourth personal task execution unit 200D are activated in response to user authentication at a corresponding position, and perform a processing only when the authenticated user is logging in. The first personal task execution unit 200A, the second personal task execution unit 200B, the third personal task execution unit 200C, and the fourth personal task execution unit 200D are different only in corresponding position and authenticated user, but have the same function. Thus, the following description will be made by way of the first personal task execution unit 200A unless otherwise specifically noted. Further, the description will be made assuming that the user A is authenticated by the authentication unit 310 at the left side of the MFP 100 and the activation unit 320 inputs the user identification information of the user A and the position of the user A as the left side into the first personal task execution unit 200A.

Figure 4:
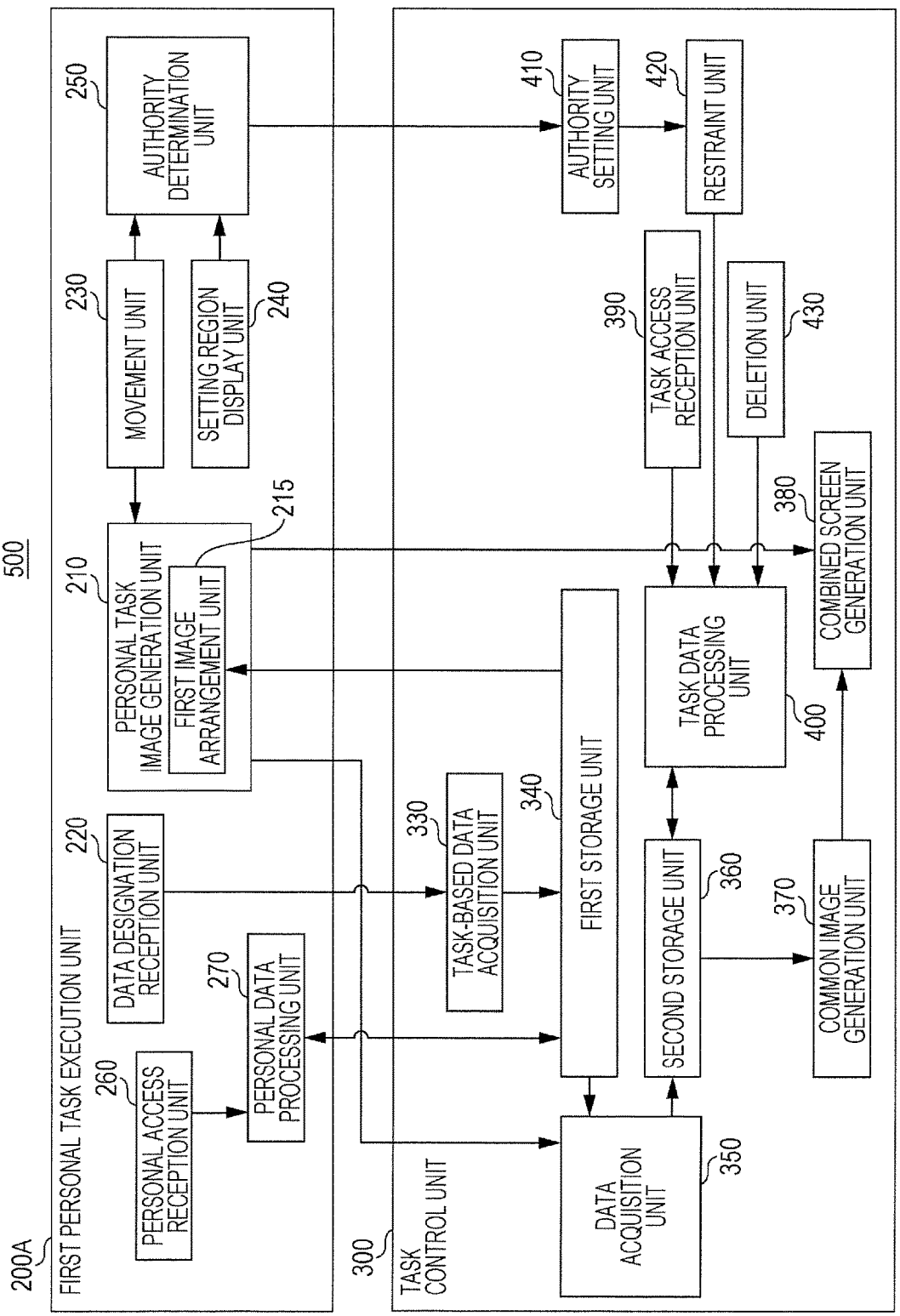
FIG. 4 is a block diagram illustrating exemplary functions of a task control unit and a first personal task execution unit according to one or more embodiments of the present invention.

FIG. 4 is a block diagram illustrating exemplary functions of the task control unit and the first personal task execution unit. With reference to FIG. 4, the first personal task execution unit 200A includes a personal task image generation unit 210, a data designation reception unit 220, a movement unit 230, a setting region display unit 240, an authority determination unit 250, a personal access reception unit 260, and a personal data processing unit 270.

The task control unit 300 includes a task-based data acquisition unit 330, a first storage unit 340, a data acquisition unit 350, a second storage unit 360, a common image generation unit 370, a combined screen generation unit 380, a task access reception unit 390, a task data processing unit 400, an authority setting unit 410, a restraint unit 420, and a deletion unit 430.

The personal task image generation unit 210 generates a personal task image to be displayed in the personal display region and the common display region defined corresponding to the left side in the display face of the display unit 120. When activated by the activation unit 320, the personal task image generation unit 210 generates a personal task image capable of discriminating the personal display region and the common display region. For example, the personal task image generation unit 210 generates a personal task image including the images indicating the contours of the personal display region and the common display region. The personal task image generation unit 210 outputs the generated personal task image to the combined screen generation unit 380. The combined screen generation unit 380 will be described below in detail, and the personal task image is combined with other image by the combined screen generation unit 380 to be displayed on the display unit 120. Thus, the personal task image generated by the personal task image generation unit 210 is displayed in the personal display region and the common display region defined corresponding to the left side in the display face of the display unit 120.

The data designation reception unit 220 receives designated data to be processed in response to a user operation. The data designation reception unit 220 outputs a pair of data identification information of the designated data and user identification information input from the activation unit 320 to the task-based data acquisition unit 330 in response to reception of the designated data. For example, the data designation reception unit 220 causes the personal task image generation unit 210 to generate a personal task image in which the data designation reception screen listing the data identification information for identifying the data is arranged in the personal display region, and receives the designated data specified by the data identification information displayed at a detected position when the position in the image, in which the data identification information is displayed, is detected by the touch panel 130. The data identification information listed by the data designation reception screen is data which a user specified by the user identification information input by the activation unit 320, or the user A is authorized to access, herein. For example, the data which the user A is authorized to access includes the data stored in a storage area assigned to the user A among a plurality of storage areas of the HDD 116, and the data stored in a storage medium which the user A is authorized to access. The storage medium includes a storage device of other information processing apparatus such as server or computer connected via the communication I/F unit 112, and the CD-ROM 118A mounted on the external storage device 118.

When input with the pair of data identification information and user identification information from the data designation reception unit 220, the task-based data acquisition unit 330 acquires the data specified by the data identification information on the authority of the user specified by the user identification information. Specifically, the task-based data acquisition unit 330 reads the data specified by the data identification information from the HDD 116 when the data specified by the data identification information is stored in the HDD 116, controls the communication I/F unit 112 and acquires the data specified by the data identification information from an external information processing apparatus when the data is stored in the external information processing apparatus, and controls the external storage device 118 and reads the data specified by the data identification information from the CD-ROM 118A when the data is stored in the CD-ROM 118A. The task-based data acquisition unit 330 outputs the pair of the acquired data and the user identification information to the first storage unit 340. The first storage unit 340 is input with the data and the user identification information from the task-based data acquisition unit 330, and stores the data in association with the user identification information. The first storage unit 340 is a predetermined area in the RAM 114, for example.

The personal task image generation unit 210 includes a first image arrangement unit 215. When the data associated with the user identification information input from the activation unit 320 is stored in the first storage unit 340, the first image arrangement unit 215 accordingly acquires the data from the first storage unit 340, and arranges the image of the acquired data in the personal display region of the personal task image thereby to update the personal task image. At this stage, the personal task image is such that the image of the user-designated data is arranged in the personal display region by the data designation reception unit 220, and thus the image of the user-designated data by the data designation reception unit 220 is displayed in the personal display region defined corresponding to the left side in the display face of the display unit 120.

The personal access reception unit 260 receives an operation on the data stored in the first storage unit 340 on the basis of an operation received by the touch panel 130. The operations on the data include a data edition operation and a data deletion operation, for example. For example, when a position in the image arranged in the personal display region by the first image arrangement unit 215 is detected by the touch panel 130, the personal access reception unit 260 specifies the data to be processed. When specifying the data to be processed, the personal access reception unit 260 outputs a set of data identification information for identifying the data, user identification information input by the activation unit 320, and operation received by the touch panel 130 to the personal data processing unit 270.

When input with the set of data identification information, user identification information, and operation from the personal access reception unit 260, the personal data processing unit 270 processes the data specified by the data identification information input by the personal access reception unit 260 among the data stored in the first storage unit 340 according to the operation input by the personal access reception unit 260 on the authority of the user specified by the user identification information. For example, when the operation input by the personal access reception unit 260 is the edition operation, the data stored in the first storage unit 340 is edited and the edited data is used for update. When the operation input by the personal access reception unit 260 is the data deletion operation, the data stored in the first storage unit 340 is erased. When the operation input by the personal access reception unit 260 is the data saving operation, the data stored in the first storage unit 340 is stored in another storage area.

The movement unit 230 moves an image arranged in the personal display region in the personal task image by the first image arrangement unit 215 to another position in the personal task image on the basis of an operation received by the touch panel 130. Specifically, when a position in the image arranged in the personal display region in the personal task image by the first image arrangement unit 215 is continuously detected by the touch panel 130 for a predetermined time, the movement unit 230 detects a drag operation. When detecting the drag operation, the movement unit 230 sets the image displayed at the position detected by the touch panel 130 at the time to be processed. After detecting the drag operation, the movement unit 230 moves the image within the personal task image according to the change in the position detected by the touch panel 130. When a position which has been detected by the touch panel 130 is not detected any more, the movement unit 230 detects a drop operation. When detecting the drop operation, the movement unit 230 arranges the image at the last-detected position thereby to update the personal task image. The personal task image generation unit 210 outputs the personal task image updated by the movement unit 230 to the combined screen generation unit 380.

The personal task image generation unit 210 detects logout of the user specified by the user identification information input by the activation unit 320. For example, when a person as object is not present in an image shot and output by the camera 140A corresponding to the first personal task execution unit 200A, the personal task image generation unit 210 corresponding to the first personal task execution unit 200A detects logout. When detecting logout of the user, the personal task image generation unit 210 outputs a set of data identification information of the data corresponding to the image arranged in the common display region in the personal task image, position information on a position in the common display region of the image arranged in the common display region, and user identification information of the user whose logout is detected to the data acquisition unit 350.

The setting region display unit 240 arranges an image indicating one or more authority setting regions in the common display region in the personal task image while the movement unit 230 receives the image movement operation. The one or more authority setting regions correspond to one or more authorities different in contents for restraining an access to data. Herein, the authority is to define an executable processing and a non-executable processing for data. For example, the authority includes an authority to permit the reading processing but not to permit the edition processing and the deletion processing, an authority to permit the reading processing and the edition processing but not to permit the deletion processing, and an authority to permit the reading processing, the edition processing, and the deletion processing. The one or more authorities include authorities different in restraint contents between before and after all the users log out.

As an exemplary authority, for the first authority, the reading processing is permitted but the edition processing and the deletion processing are prohibited before all the users log out, and the data reading processing, the edition processing, and the deletion processing are prohibited after all the users log out. For the second authority, the reading processing and the edition processing are permitted but the deletion processing is prohibited before all the users log out, and the reading processing is permitted but the edition processing and the deletion processing are prohibited after all the users log out. For the third authority, the reading processing, the edition processing, and the deletion processing are permitted before all the users log out, and the reading processing is permitted but the edition processing and the deletion processing are prohibited after all the users log out.

The authority determination unit 250 determines an authority to be given to the data corresponding to the moved image on the basis of the position in which the image is arranged after the image is moved by the movement unit 230. When the position in which the image is arranged after the image is moved by the movement unit 230 is included in any of the one or more authority setting regions arranged in the personal task image by the setting region display unit 240, the authority determination unit 250 specifies an authority setting region including the position of the image moved by the movement unit 230 among the one or more authority setting regions, and specifies the data corresponding to the image moved by the movement unit 230. The authority determination unit 250 determines an authority corresponding to the specified authority setting region for the specified data, and outputs the data identification information of the determined data and the specified authority to the authority setting unit 410.

When logout of a user is detected by the personal task image generation unit 210, the data acquisition unit 350 is input with the set of data identification information, position information, and user identification information from the personal task image generation unit 210. When input with the set of data identification information, position information, and user identification information from the personal task image generation unit 210, the data acquisition unit 350 acquires the data specified by the data identification information input by the personal task image generation unit 210 among the data stored in the first storage unit 340, and outputs the acquired data, the position information, and the user identification information to the second storage unit 360. At this stage, the first storage unit 340 deletes the data output to the data acquisition unit 350. The second storage unit 360 is input with the data, the position information, and the user identification information from the data acquisition unit 350, and stores the data in association with the position information and the user identification information. The second storage unit 360 is a predetermined area in the RAM 114, for example.

When the data is stored in the second storage unit 360, the common image generation unit 370 accordingly generates a common image. The common image includes the common display region whose position in the display face of the display unit 120 is common among the first personal task execution unit 200A, the second personal task execution unit 200B, the third personal task execution unit 200C, and the fourth personal task execution unit 200D. Specifically, when the data is stored in the second storage unit 360, the common image generation unit 370 accordingly acquires the data, the position information, and the user identification information from the second storage unit 360. Thereafter, the common image generation unit 370 generates a common image in which the image of the acquired data is arranged at the position specified by the position information in the common display region. The common image generation unit 370 outputs the generated common image to the combined screen generation unit 380.

The combined screen generation unit 380 is input with the common image from the common image generation unit 370, and is input with the personal task image from the personal task image generation unit 210. The combined screen generation unit 380 generates a combined screen in which the common image input by the common image generation unit 370 and the personal task image input by the personal task image generation unit 210 are combined.

FIG. 4 illustrates only the first personal task execution unit 200A among the first personal task execution unit 200A, the second personal task execution unit 200B, the third personal task execution unit 200C, and the fourth personal task execution unit 200D, and assumes that a personal task image is input from the first personal task execution unit 200A into the combined screen generation unit 380. The combined screen generation unit 380 may be input with a personal task image from at least one of the second personal task execution unit 200B, the third personal task execution unit 200C, and the fourth personal task execution unit 200D. In the following description, a personal task image output from the first personal task execution unit 200A to the combined screen generation unit 380 is denoted as first personal task image, a personal task image output from the second personal task execution unit 200B to the combined screen generation unit 380 is denoted as second personal task image, a personal task image output from the third personal task execution unit 200C to the combined screen generation unit 380 is denoted as third personal task image, and a personal task image output from the fourth personal task execution unit 200D to the combined screen generation unit 380 is denoted as fourth personal task image. The combined screen generation unit 380 generates a combined screen in which the common image, the first personal task image, the second personal task image, the third personal task image, and the fourth personal task image are combined. Further, the combined screen generation unit 380 controls the display unit 120 and displays the generated combined screen thereon.

When input with the data identification information and the authority by the authority determination unit 250, the authority setting unit 410 gives the authority input by the authority determination unit 250 to the data specified by the data identification information input from the authority determination unit 250 among the data stored in the second storage unit 360. The restraint unit 420 restrains a series of processing which the task data processing unit 400 can execute on the data specified by the data identification information input by the authority determination unit 250 within a range defined by the authority input by the authority determination unit 250.

The task access reception unit 390 receives an operation on the data stored in the second storage unit 360 on the basis of an operation received by the touch panel 130. The operations on the data include a data edition operation, a data deletion operation, and a data saving operation, for example. For example, when a position in the image arranged in the common display region in the common image generated by the common image generation unit 370 is detected by the touch panel 130, the task access reception unit 390 specifies data to be processed. When specifying the data to be processed, the task access reception unit 390 outputs a pair of data identification information for identifying the data and operation received by the touch panel 130 to the task data processing unit 400.

When input with the set of data identification information and operation from the task access reception unit 390, the task data processing unit 400 processes the data specified by the data identification information input by the task access reception unit 390 among the data stored in the second storage unit 360 according to the operation input by the task access reception unit 390 without a restraint by the restraint unit 420. For example, when the operation input by the task access reception unit 390 is the data edition operation, the task data processing unit 400 edits the data and uses the edited data for update under the condition that the data stored in the second storage unit 360 is permitted to edit. When the operation input by the task access reception unit 390 is the data deletion operation, the task data processing unit 400 erases the data under the condition that the data stored in the second storage unit 360 is permitted to delete. When the operation input by the task access reception unit 390 is the data saving operation, the task data processing unit 400 saves the data in another storage area under the condition that the data stored in the second storage unit 360 is permitted to save.

The deletion unit 430 sets an effective period of the data on the basis of an operation received by the touch panel 130. When the effective period of the data elapses after all the users log out, the deletion unit 430 outputs an instruction to delete the data stored in the second storage unit 360 to the task data processing unit 400. When input with the deletion instruction by the deletion unit 430, the task data processing unit 400 deletes the data stored in the second storage unit 360 irrespective of any restraint by the restraint unit 420. Thereby, the data is prevented from being diffused after the effective period elapses since the end of the conference.

Figure 5:
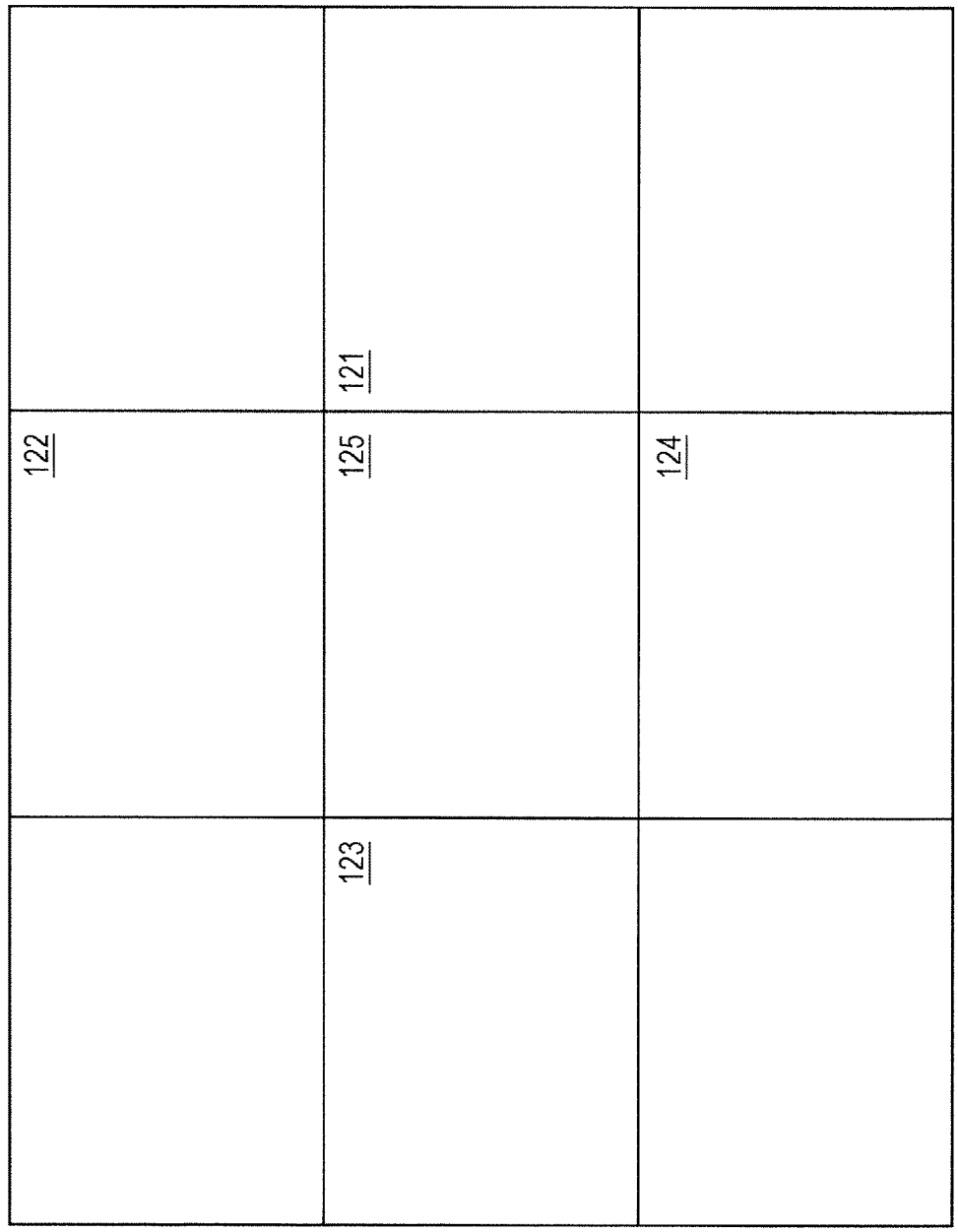
FIG. 5 is a plan view illustrating a display face of a display unit according to one or more embodiments of the present invention.

FIG. 5 is a plan view illustrating the display face of the display unit. With reference to FIG. 5, the display face of the display unit 120 includes a first personal display region 121, a second personal display region 122, a third personal display region 123, a fourth personal display region 124, and a common display region 125. The first personal display region 121 is positioned near the left side of the MFP 100 among the four sides of the display face. The second personal display region 122 is positioned near the back side of the MFP 100 among the four sides of the display face. The third personal display region 123 is positioned near the right side of the MFP 100 among the four sides of the display face. The fourth personal display region 124 is positioned near the front side of the MFP 100 among the four sides of the display face. The common display region 125 is positioned at the center of the display face.

Figure 6:
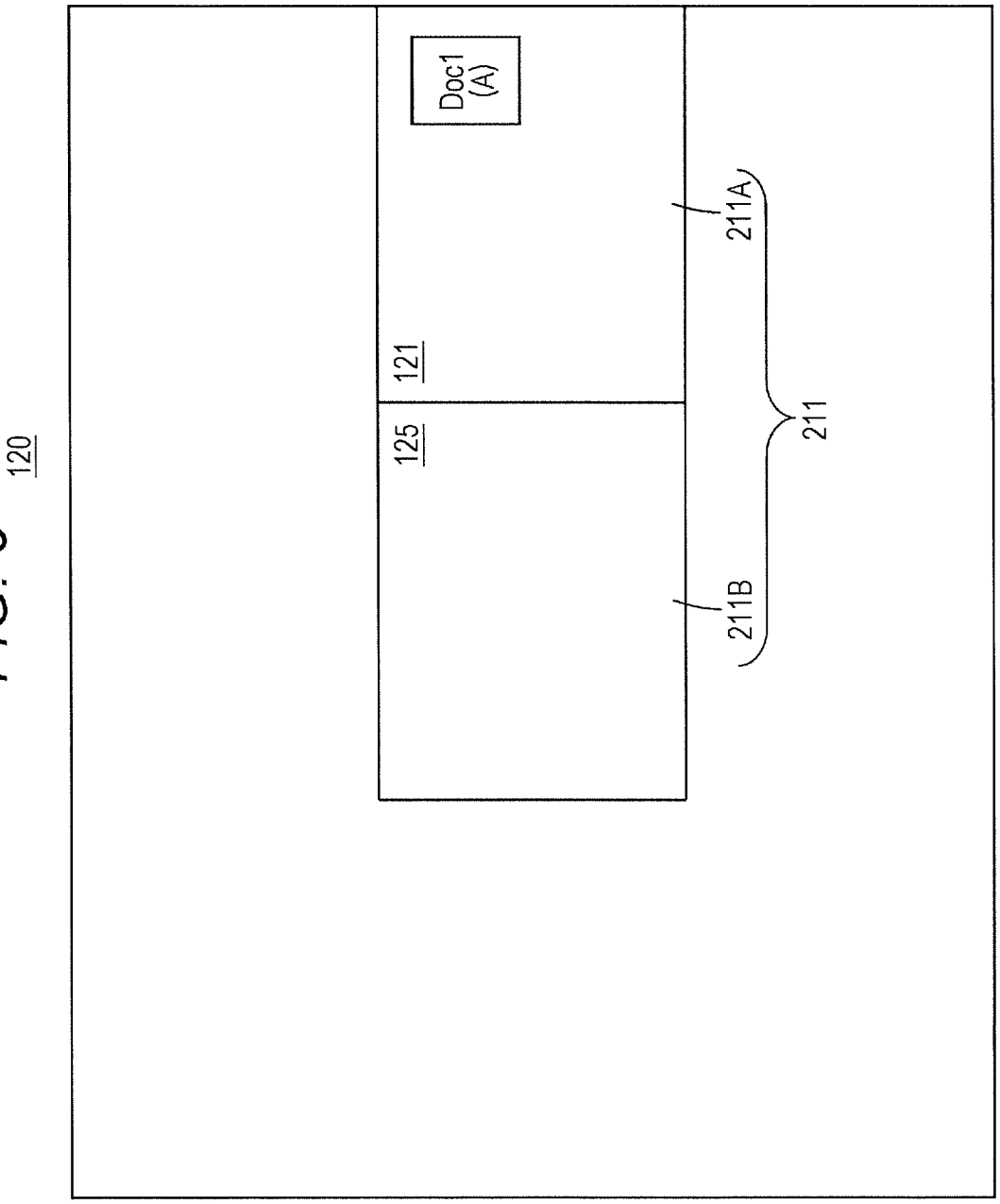
FIG. 6 is a diagram illustrating an exemplary first personal task image according to one or more embodiments of the present invention.

FIG. 6 is a diagram illustrating an exemplary first personal task image. With reference to FIG. 6, a first personal task image 211 includes a first personal region image 211A arranged in the first personal display region 121 and a first common image 211B arranged in the common display region 125. The first common image 211B is arranged in the common display region 125 at the center of the display face, and the first personal region image 211A is arranged in the first personal display region 121 at the left side of the display face. When the user A shot by the camera 140A installed at the left side of the MFP 100 is authenticated, the first personal task image 211 is generated by the first personal task execution unit 200A. Thus, the first personal region image 211A is arranged in the first personal display region 121 closest to the user A in the display face. The first personal task image 211 includes an image of user-designated data in the first personal region image 211A. FIG. 6 illustrates an example in which an image Doc1 of user A-designated data to be processed is displayed in the first personal region image 211A.

Figure 7:
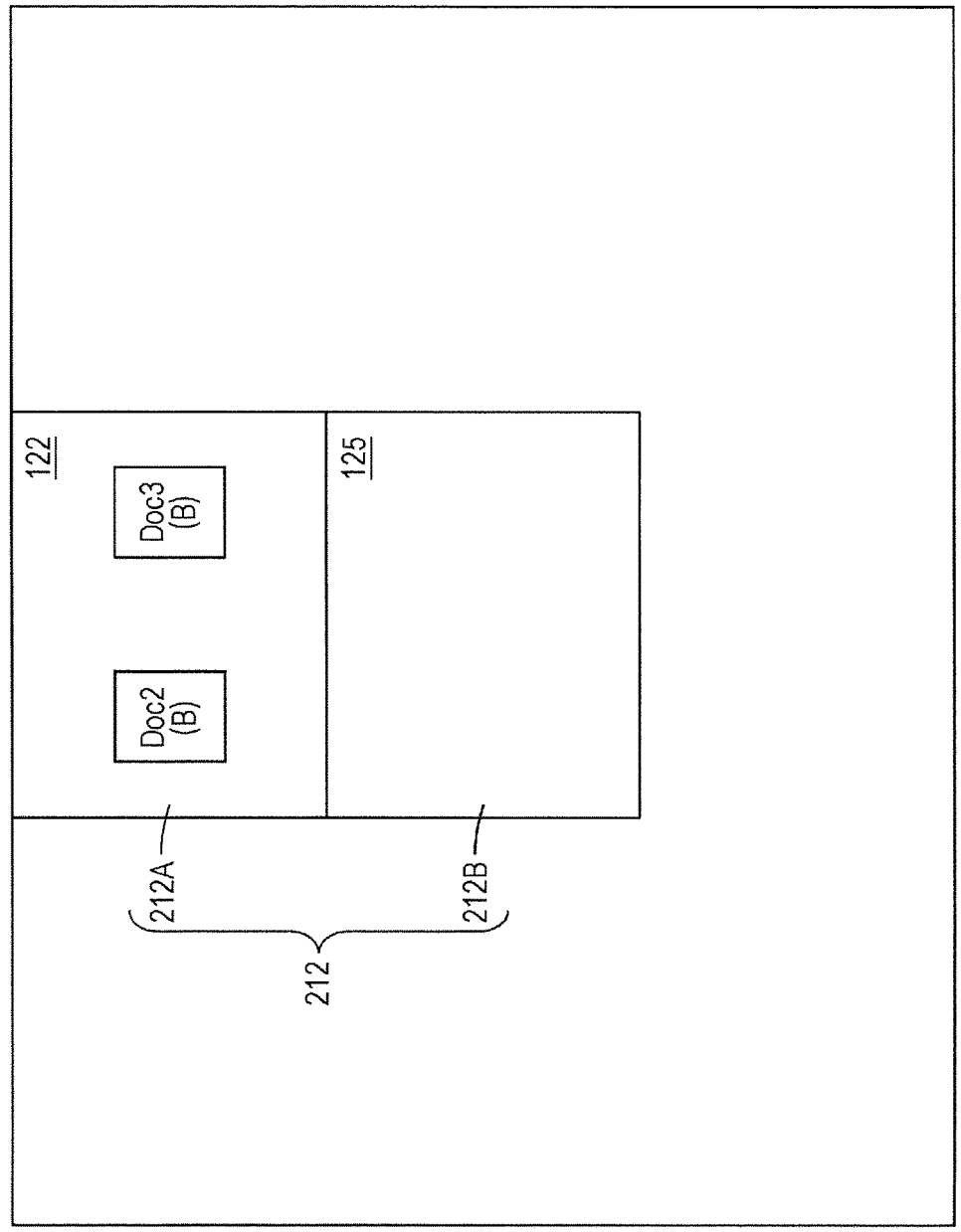
FIG. 7 is a diagram illustrating an exemplary second personal task image according to one or more embodiments of the present invention.

FIG. 7 is a diagram illustrating an exemplary second personal task image. With reference to FIG. 7, a second personal task image 212 includes a second personal region image 212A arranged in the second personal display region 122 and a second common image 212B arranged in the common display region 125. The second common image 212B is arranged in the common display region 125 at the center of the display face and the second personal region image 212A is arranged in the second personal display region 122 at the back side of the display face. When the user B shot by the camera 140B installed at the back side of the MFP 100 is authenticated, the second personal task image 212 is generated by the second personal task execution unit 200B. Thus, the second personal region image 212A is arranged in the second personal display region 122 closest to the user B in the display face. The second personal task image 212 includes an image of user-designated data in the second personal region image 212A. FIG. 7 illustrates an example in which an image Doc2 and an image Doc3 of user B-designated data to be processed are displayed in the second personal region image 212A.

Figure 8:
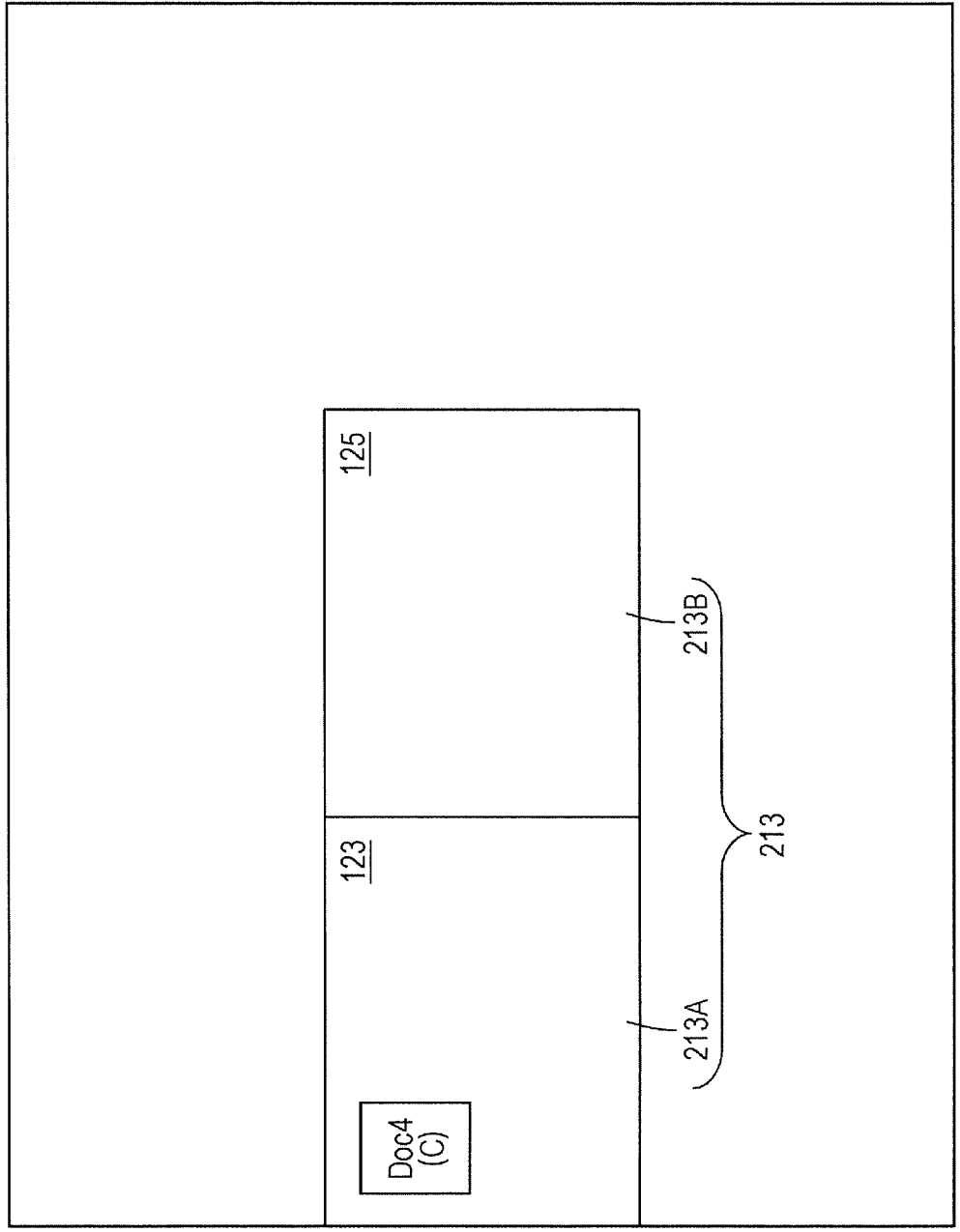
FIG. 8 is a diagram illustrating an exemplary third personal task image according to one or more embodiments of the present invention.

FIG. 8 is a diagram illustrating an exemplary third personal task image. With reference to FIG. 8, a third personal task image 213 includes a third personal region image 213A arranged in the third personal display region 123 and a third common image 213B arranged in the common display region 125. The third common image 213B is arranged in the common display region 125 at the center of the display face and the third personal region image 213A is arranged in the third personal display region 123 at the right side of the display face. When the user C shot by the camera 140C installed at the right side of the MFP 100 is authenticated, the third personal task image 213 is generated by the third personal task execution unit 200C. Thus, the third personal region image 213A is arranged in the third personal display region 123 closest to the user C in the display face. The third personal task image 213 includes an image of user-designated data in the third personal region image 213A. FIG. 8 illustrates an example in which an image Doc4 of user C-designated data to be processed is displayed in the third personal region image 213A.

Figure 9:
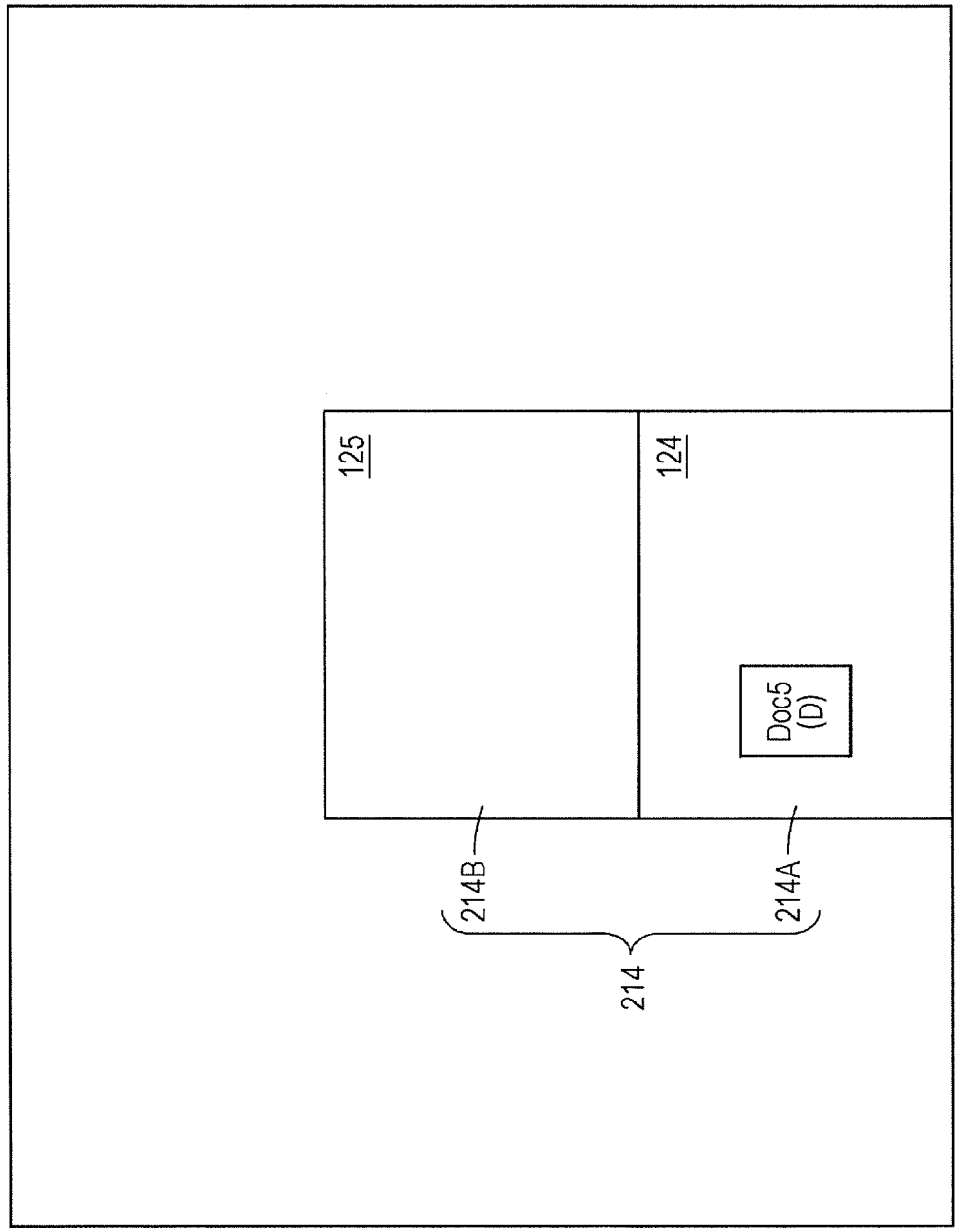
FIG. 9 is a diagram illustrating an exemplary fourth personal task image according to one or more embodiments of the present invention.

FIG. 9 is a diagram illustrating an exemplary fourth personal task image. With reference to FIG. 9, a fourth personal task image 214 includes a fourth personal region image 214A arranged in the fourth personal display region 124 and a fourth common image 214B arranged in the common display region 125. The fourth common image 214B is arranged in the common display region 125 at the center of the display face and the fourth personal region image 214A is arranged in the fourth personal display region 124 at the back side of the display face. When the user D (not illustrated) shot by the camera 140D installed at the front side of the MFP 100 is authenticated, the fourth personal task image 214 is generated by the fourth personal task execution unit 200D. Thus, the fourth personal region image 214A is arranged in the fourth personal display region 124 closest to the user D in the display face. The fourth personal task image 214 includes an image of user-designated data in the fourth personal region image 214A. FIG. 9 illustrates an example in which an image Doc5 of user D-designated data to be processed is displayed in the fourth personal region image 214A.

The first personal region image 211A, the second personal region image 212A, the third personal region image 213A, and the fourth personal region image 214A are arranged at the different positions in the display face of the display unit 120 for the corresponding users A to D, respectively. Thus, the first personal region image 211A, the second personal region image 212A, the third personal region image 213A, and the fourth personal region image 214A do not overlap on each other.

On the other hand, the first common image 211B, the second common image 212B, the third common image 213B, and the fourth common image 214B are arranged in the same common display region 125 in the display face of the display unit 120 for the corresponding users A to D. Thus, the first common image 211B, the second common image 212B, the third common image 213B, and the fourth common image 214B are combined to overlap on each other in the common display region 125. When the touch panel 130 receives an operation of changing a position or size of the common display region 125, the combined screen generation unit 380 may change a position or size of the common display region 125 in the display face of the display unit 120 depending on the received operation.

Figure 10:
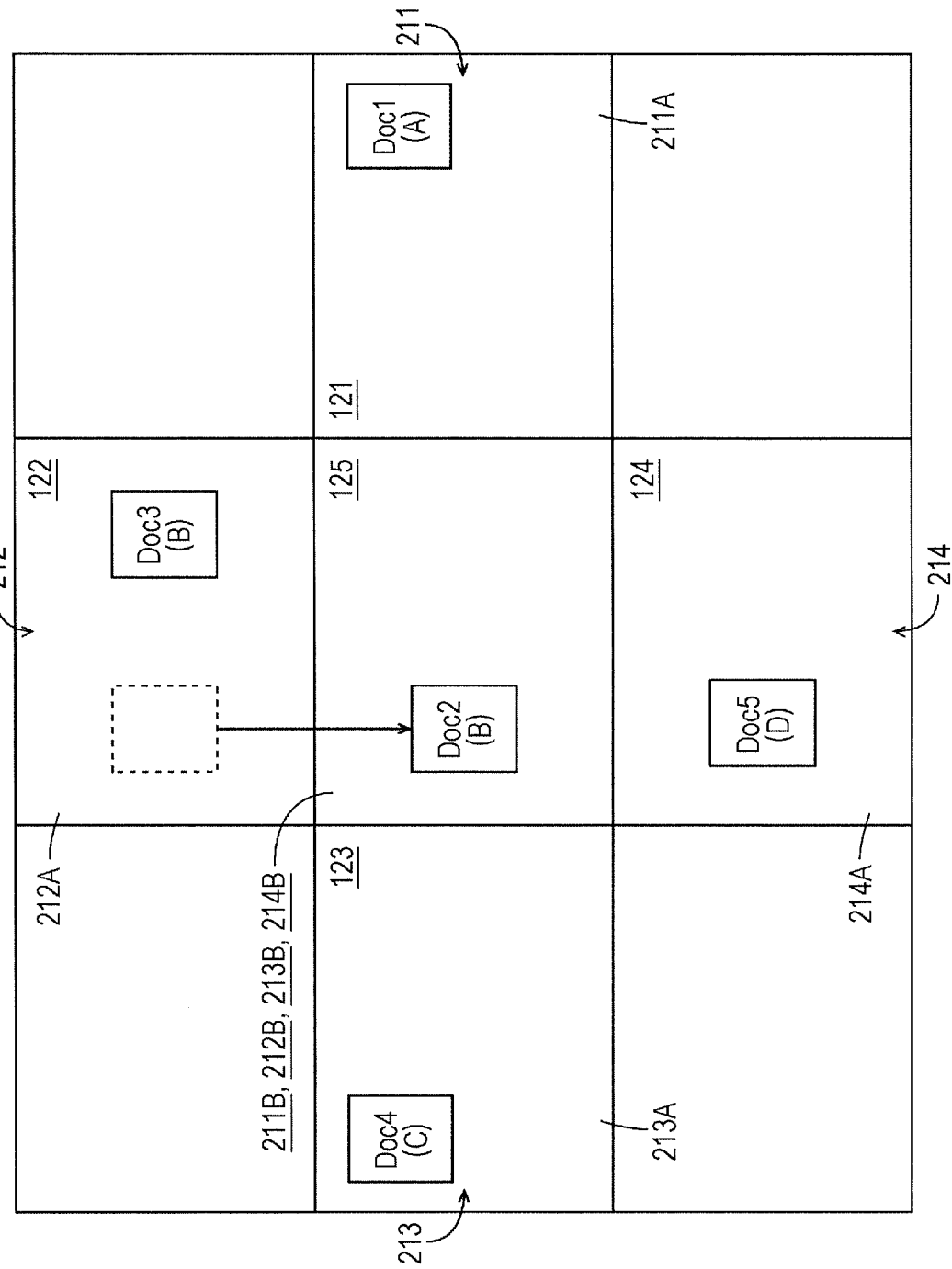
FIG. 10 is a diagram illustrating exemplary movement of an image arranged in a personal display region according to one or more embodiments of the present invention.

FIG. 10 is a diagram illustrating exemplary movement of an image arranged in a personal display region. Herein, the description will be made by way of the second personal task image 212 assuming that an image arranged in the second personal display region 122 is moved to the common display region 125. With reference to FIG. 10, the image Doc2 out of the image Doc2 and the image Doc3 arranged in the second personal display region 122 is moved to the common display region 125 by the drag operation, the movement operation of moving a finger, and the drop operation by the user B. The second personal task image 212 is updated from the state in which the second personal region image 212A includes the image Doc2 and the image Doc3 and the second common image 212B does not include an image to the state in which the second personal region image 212A includes the image Doc3 and the second common image 212B includes the image Doc2.

Figure 11:
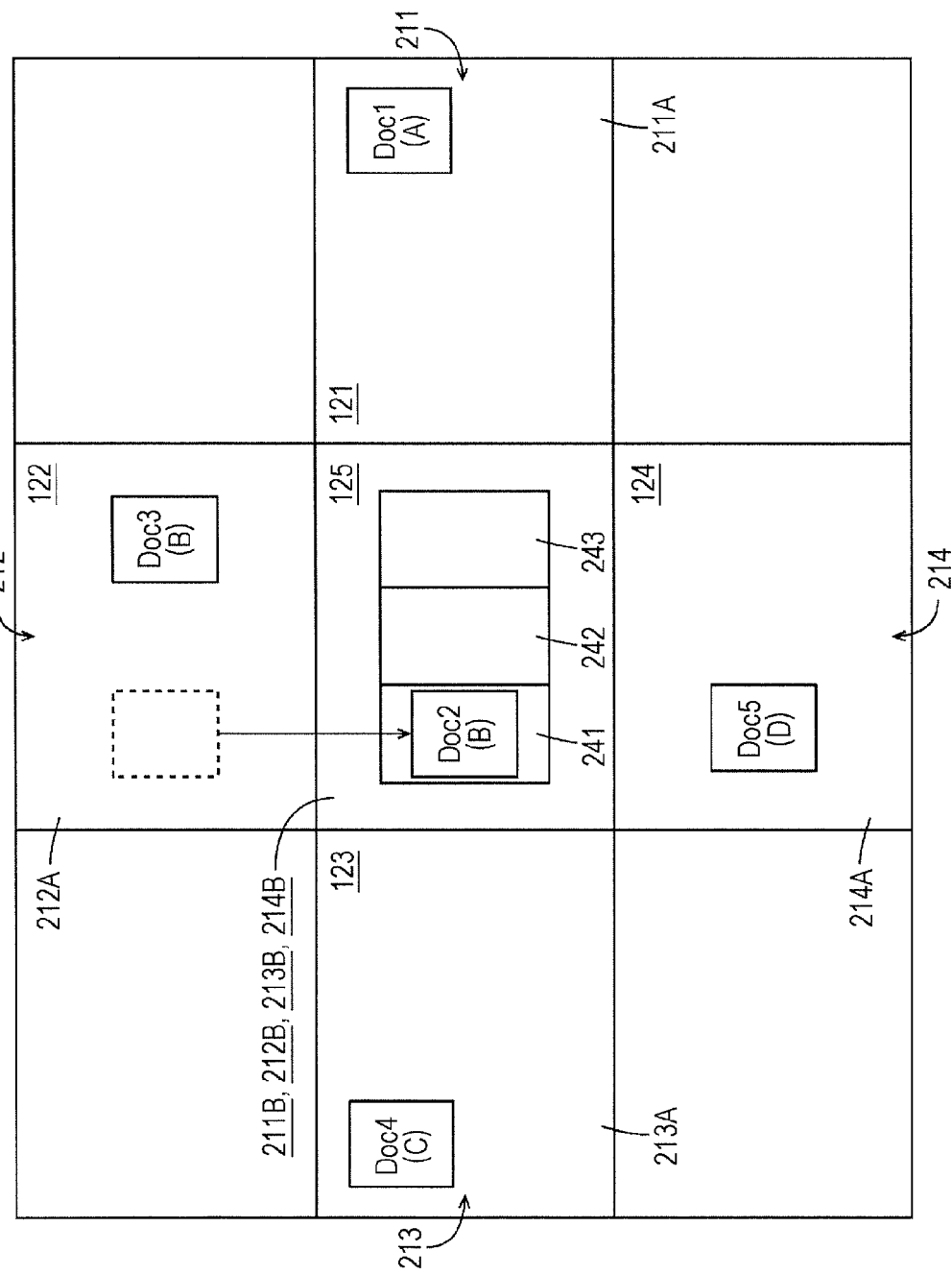
FIG. 11 is a diagram illustrating exemplary authority setting regions according to one or more embodiments of the present invention.

FIG. 11 is a diagram illustrating exemplary authority setting regions. The description will be made herein by way of authority setting regions which are valid while the operation of moving the image Doc2 arranged in the second personal display region 122 illustrated in FIG. 10 to the common display region 125 is being received. With reference to FIG. 11, the second personal task image 212 includes an image indicating three authority setting regions 241 to 243 in the second common image 212B. The authority setting region 241 is assigned with a first authority, the authority setting region 242 is assigned with a second authority, and the authority setting region 243 is assigned with a third authority.

When the image Doc2 is moved to any of the authority setting regions 241 to 243 or to a position within the authority setting region 241 by the user's drop operation, the first authority for the authority setting region 241 is given to the data corresponding to the image Doc2. Further, after the user's drop operation is received, the second personal task image 212 is updated to the state in which the second personal region image 212A includes the image Doc3 and the second common image 212B includes the image Doc2, and the image of the authority setting regions 241 to 243 is hidden. Further, the first authority corresponding to the authority setting region 241 is given to the data corresponding to the image Doc2.

Figure 12:
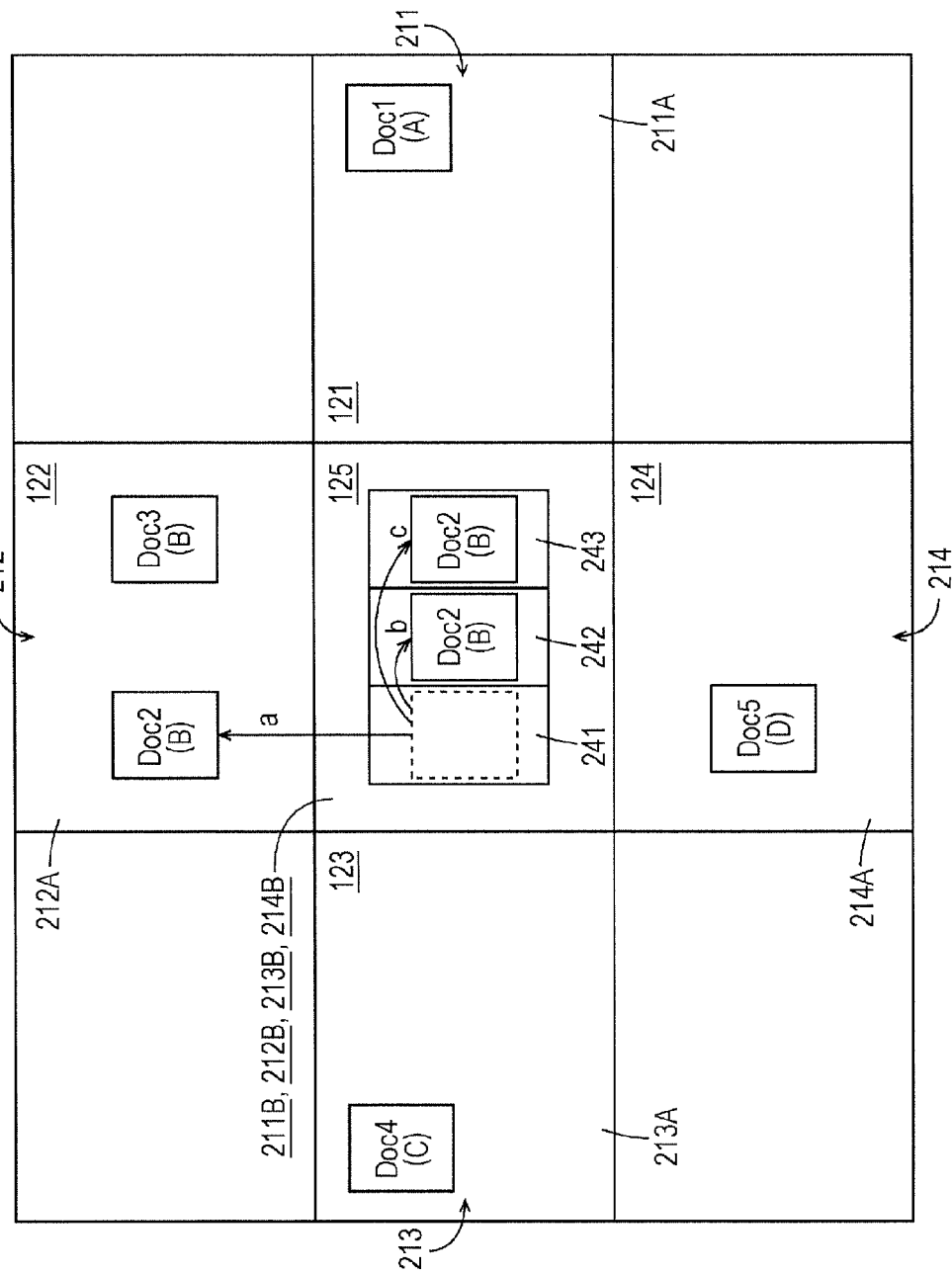
FIG. 12 is a diagram illustrating an exemplary operation of changing an authority of authority-given data according to one or more embodiments of the present invention.

Further, when the first authority is given to the data corresponding to the image Doc2 and then the image Doc2 is moved to the second personal display region 122, the first authority given to the data corresponding to the image Doc2 is canceled. FIG. 12 is a diagram illustrating an exemplary operation of changing an authority of authority-given data. With reference to FIG. 12, when the image Doc2 moved to the authority setting region 241 is further moved to the second personal display region 122 as indicated by an arrow a by the drag operation, the movement operation, and the drop operation of the user, the first authority given to the image Doc2 is canceled. When the image Doc2 moved to the authority setting region 241 is further moved to the authority setting region 242 as indicated by an arrow b, the first authority given to the data corresponding to the image Doc2 is updated to the second authority corresponding to the authority setting region 242. When the image Doc2 moved to the authority setting region 241 is further moved to the authority setting region 243 as indicated by an arrow c, the first authority given to the image Doc2 is updated to the third authority corresponding to the authority setting region 243.

Figure 13:
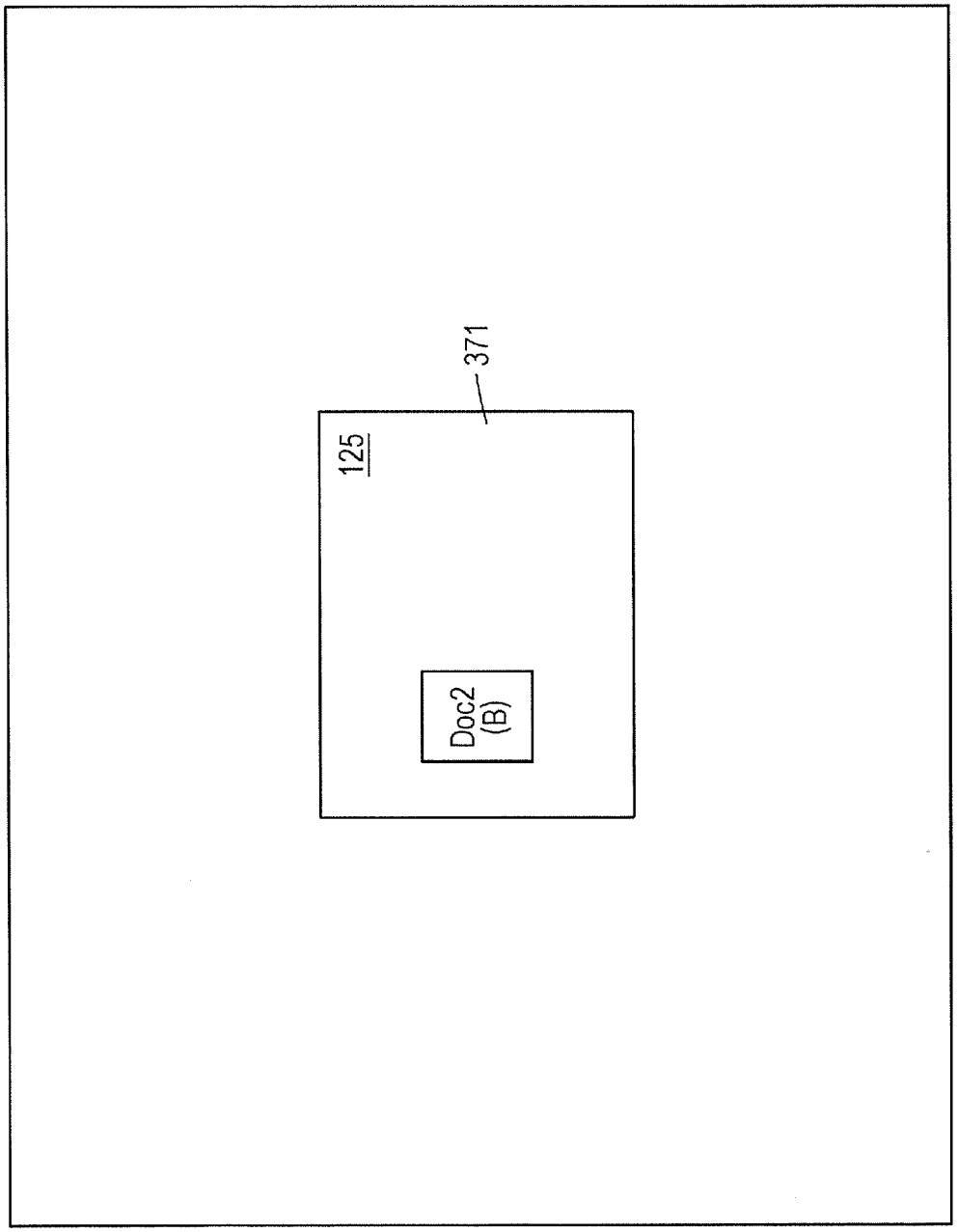
FIG. 13 is a diagram illustrating an exemplary common image according to one or more embodiments of the present invention.

FIG. 13 is a diagram illustrating an exemplary common image. A common image 371 is arranged in the common display region 125. In FIG. 13, there will be described a common image generated when the user B logs out while the updated second personal task image 212 illustrated in FIG. 10 is being displayed. With reference to FIG. 13, the common image 371 includes the image Doc2 included in the second common image 212B of the second personal task image 212 illustrated in FIG. 10.

Figure 14:
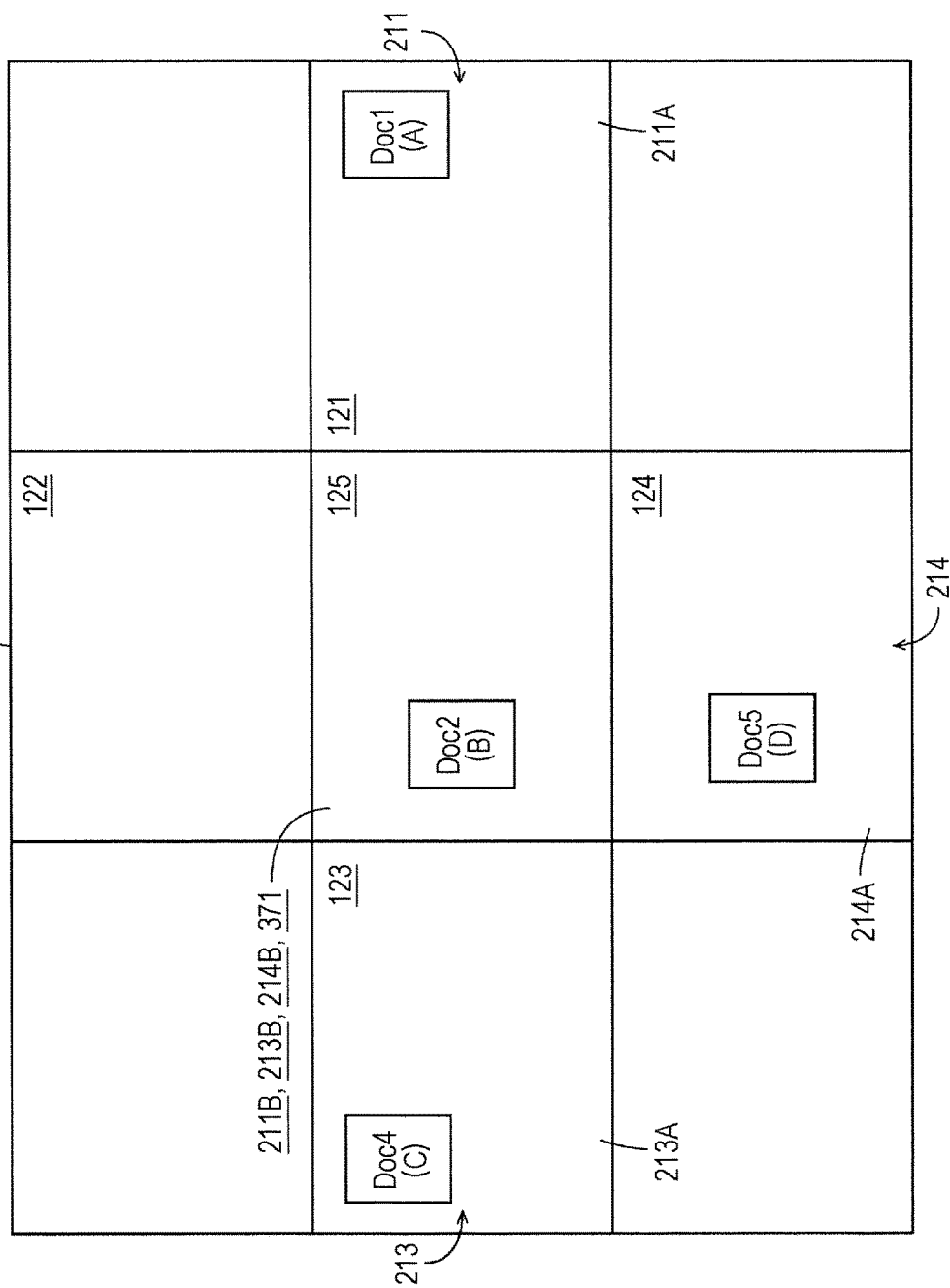
FIG. 14 is a diagram illustrating an exemplary combined screen according to one or more embodiments of the present invention.

FIG. 14 is a diagram illustrating an exemplary combined screen. A combined screen generated when the user B logs out will be described herein. When the user B logs out, the second personal task image 212 illustrated in FIG. 10 is hidden. With reference to FIG. 14, a combined screen 381 is an image in which the first personal task image 211, the third personal task image 213, the fourth personal task image 214, and the common image 371 are combined. In FIG. 14, the combined screen 381 is an image in which the first personal task image 211, the third personal task image 213, and the fourth personal task image 214 corresponding to the logged-in users A, C, and D, respectively, are combined with the common image 371.

Figure 15:
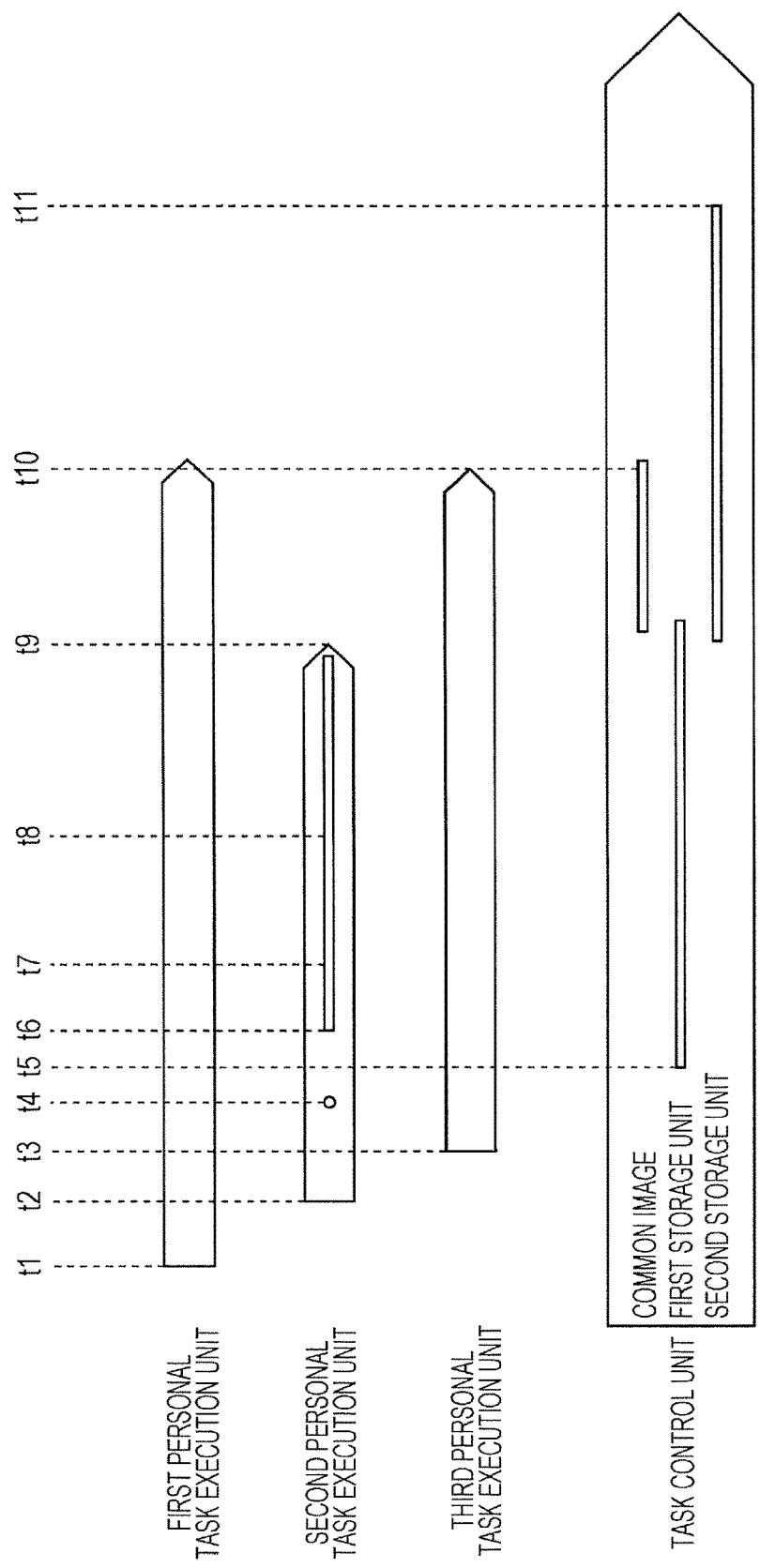
FIG. 15 is a time chart illustrating exemplary operations of the MFP according to one or more embodiments of the present invention.

FIG. 15 is a time chart illustrating exemplary operations of the MFP. With reference to FIG. 15, the MFP 100 authenticates the user A at time t1. Herein, the use A is authenticated on the basis of an image input by the camera 140A, and thus a position of the user A is determined at the left side and the first personal task image 211 is displayed on the display unit 120.

The MFP 100 authenticates the user B at time t2. Herein, the user B is authenticated on the basis of an image input by the camera 140B, and thus a position of the user B is determined at the back side, and a combined screen in which the second personal task image 212 is combined with the first personal task image 211 is displayed on the display unit 120.

The MFP 100 authenticates the user C at time t3. Herein, the user C is authenticated on the basis of an image input by the camera 140C, and thus a position of the user C is at the right side, and a combined screen in which the third personal task image 213 is combined with the first personal task image 211 and the second personal task image 212 is displayed on the display unit 120.

Then, when the user B inputs an operation of designating data at time t4, the MFP 100 acquires the user B-designated data on the authority of the user B and stores it in the first storage unit 340 at time t5, and displays the image Doc2 of the stored data in the second personal display region 122 at time t6.

The MFP 100 moves the image Doc2 arranged in the second personal display region 122 by the drag operation, the movement operation, and the drop operation of the user between time t7 and time t8. While the image Doc2 is selected by the user's drag operation and the user's movement operation is received, the MFP 100 displays the image of the authority setting regions 241 to 243 in the common display region 125.

When receiving the user's drop operation, the MFP 100 determines an authority for the data corresponding to the image Doc2 on the basis of a position specified by the drop operation. Herein, when the image Doc2 is moved to the authority setting region 241 by the user's movement operation and the drop operation is received, an authority to be given to the data corresponding to the image Doc2 is determined as the first authority.

The MFP 100 detects logout of the use B at time t9. Herein, when a person image is not present in an image shot and output by the camera 140B, logout of the user B is detected. When detecting that the user B logs out, the MFP 100 stops displaying the second personal task image 212. Further, the MFP 100 specifies the image Doc2 of the data acquired on the authority of the user B among the images displayed in the common display region 125, stores the data corresponding to the image Doc2 specified from among the data stored in the first storage unit 340 with the first authority given thereto in the second storage unit 360, and erases it from the first storage unit 340. Further, the MFP 100 generates and displays a common image including the image Doc2 of the data stored in the second storage unit 360. Thus, the logged-in users C and A can browse the image Doc2 of the data acquired on the authority of the user B even after the user B logs out. The logged-in users C and A can further access the data corresponding to the image Doc2 on the first authority given thereto.

Thereafter, the MFP 100 detects logout of the users C and A at time t10. Herein, when a person image is not present in the images shot and output by the cameras 140C and 140A, logout of the users C and A is detected. In this case, the MFP 100 finishes displaying the first personal task image 211 and the third personal task image 213 displayed on the display unit 120.

When a period after time t10 exceeds the previously-determined effective period, the MFP 100 deletes the data corresponding to the image Doc2 stored in the second storage unit 360 at time t11. The MFP 100 permits the data corresponding to the image Doc2 stored in the second storage unit 360 to be accessed on the first authority given to the data in the period between time t10 and time t11.

Figure 16:
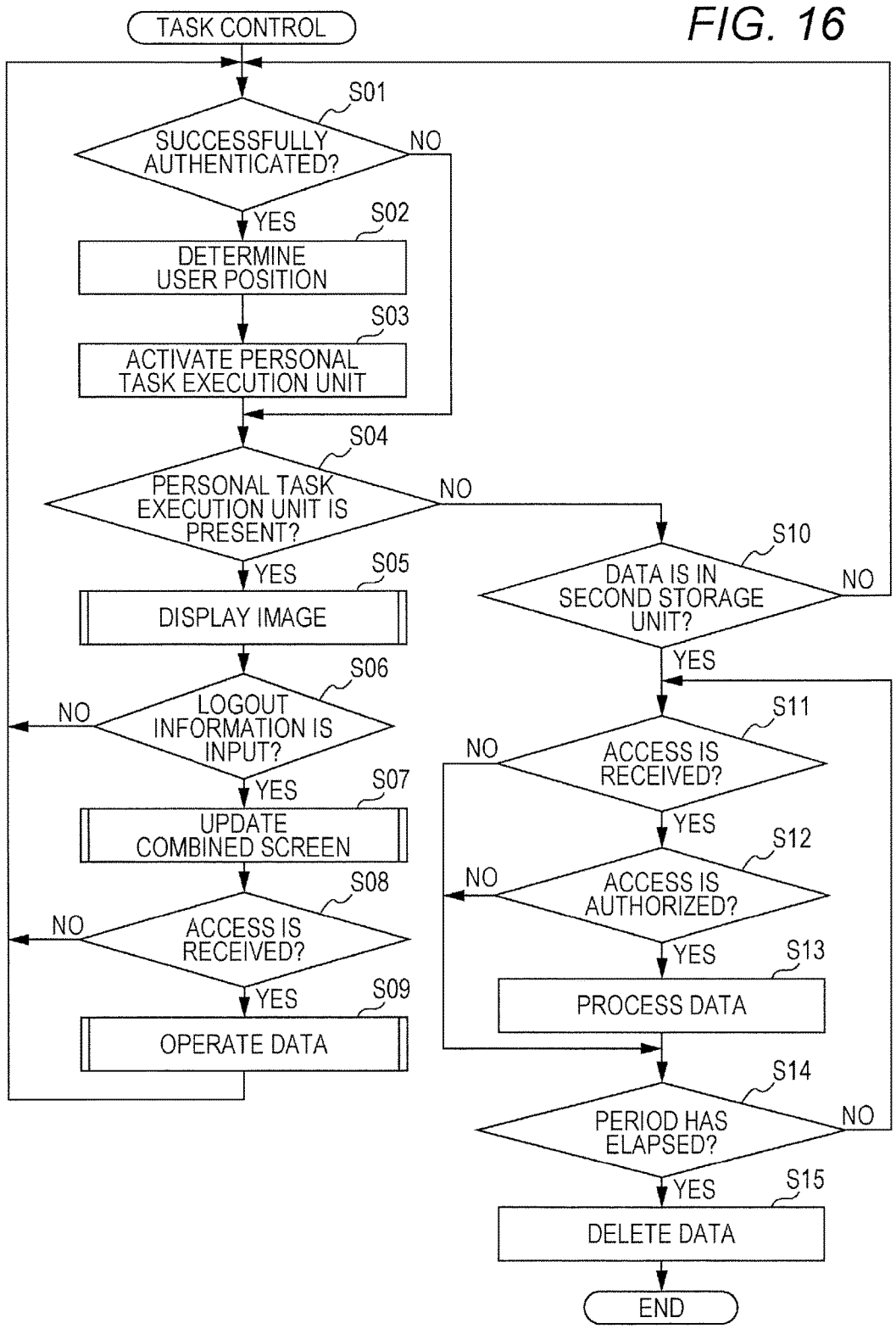
FIG. 16 is a flowchart illustrating an exemplary flow of a task control processing according to one or more embodiments of the present invention.

FIG. 16 is a flowchart illustrating an exemplary flow of a task control processing. The CPU 111 provided in the MFP 100 executes a task control program stored in the ROM 113, the EEPROM 115, the HDD 116, or the CD-ROM 118A so that the task control processing is performed by the CPU 111. The task control program is part of the conference support program. The task that the CPU 111 executes the task control program will be denoted as task controlling task below.

With reference to FIG. 16, the task controlling task determines whether a user is successfully authenticated (step S01). Specifically, the task controlling task authenticates a user by face authentication on the basis of the images input from the cameras 140A to 140D. When the user is successfully authenticated, the processing of the task controlling task proceeds to step S02, and otherwise the processing proceeds to step S04. In step S02, a position of the user is determined on the basis of the position in which the camera shooting the authenticated user is arranged, and the processing proceeds to step S03. In step S03, the personal task corresponding to the authenticated user is activated, and the processing proceeds to step S04. Specifically, the CPU 111 executes the personal task execution program thereby to activate the personal task. The task controlling task outputs the position and the user identification information of the authenticated user to the activated personal task.

Figure 17:
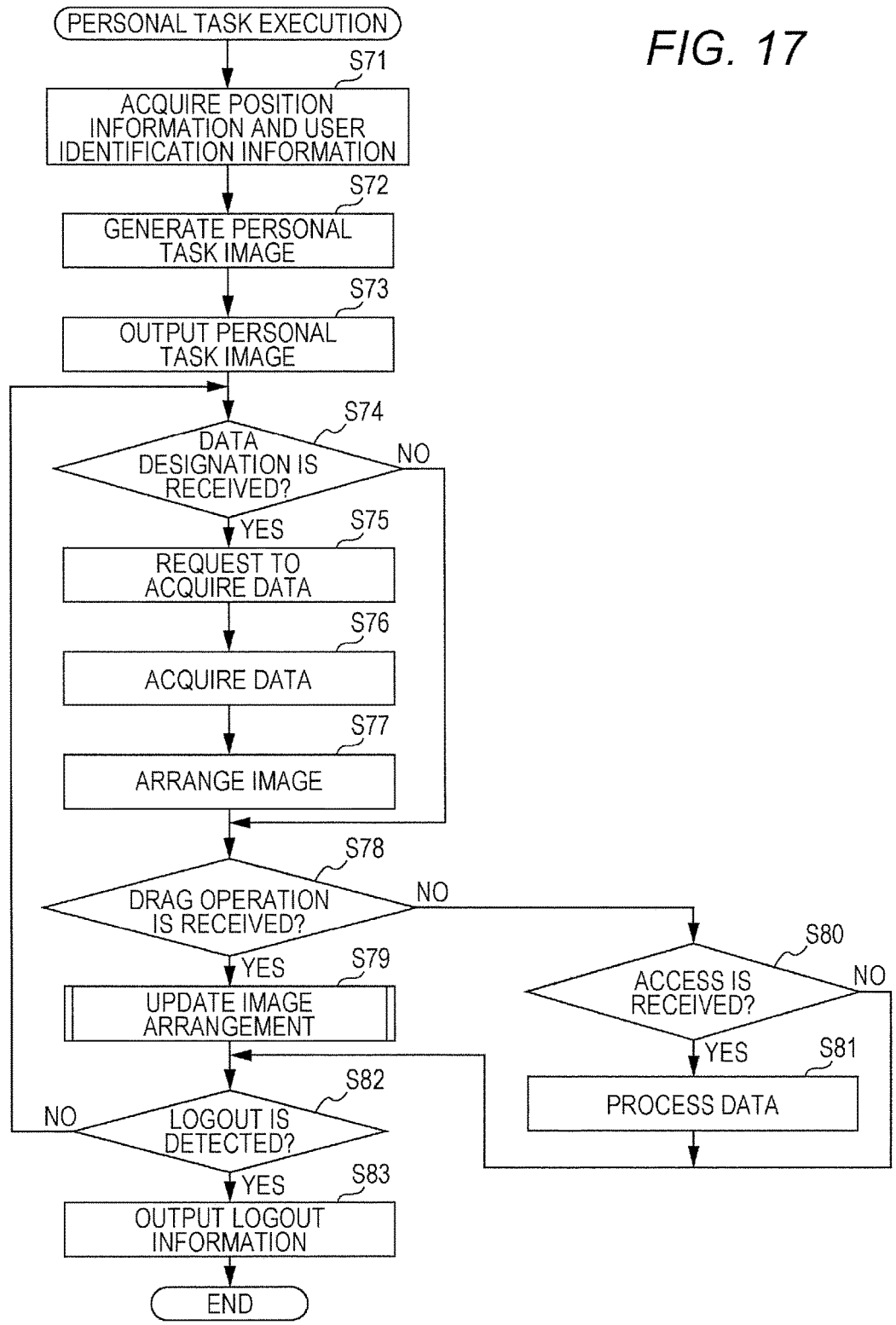
FIG. 17 is a flowchart illustrating an exemplary flow of a personal task execution processing according to one or more embodiments of the present invention.

A personal task execution processing performed by the activated personal task will be described herein. FIG. 17 is a flowchart illustrating an exemplary flow of the personal task execution processing. The CPU 111 provided in the MFP 100 executes the personal task execution program stored in the ROM 113, the EEPROM 115, the HDD 116, or the CD-ROM 118A in response to the processing in step S03 in FIG. 16 so that the personal task execution processing is performed by the CPU 111. The personal task execution program is part of the conference support program. The task that the CPU 111 executes the personal task execution program will be denoted as personal task below. Further, the personal task is activated by the task controlling task, and the processing thereof is performed in parallel with the task controlling task. Further, a plurality of personal tasks may be activated by the task controlling task.

With reference to FIG. 17, the personal task acquires position information and user identification information output from the task controlling task (step S71). In step S72, a personal task image is generated, and the processing proceeds to step S73. Specifically, the personal display region is specified on the basis of the position information acquired from the task controlling task, and a personal task image to be displayed in the personal display region and the common display region in the display face of the display unit 120 is generated.

In step S73, the generated personal task image is output to the task controlling task, and the processing proceeds to step S74. The processing performed by the task controlling task when the personal task image is input will be described below in detail, and a combined screen including the personal task image is displayed on the display unit 120.

In step S74, a determination is made as to whether data designation is received by the user. Specifically, a personal task image in which the data designation reception screen listing the data identification information for identifying data is arranged in the personal display region is generated and a position in the image displaying the data identification information therein is detected by the touch panel 130, and thus the data specified by the data identification information displayed at the detected position is received. When the personal task receives the data designation, the processing proceeds to step S75, and otherwise the processing proceeds to step S78.

In step S75, a data acquisition request is output to the task controlling task, and the processing proceeds to step S76. The data acquisition request includes the user identification information acquired in step S71 and the data identification information of the data designated in step S74. The processing performed by the task controlling task when the data acquisition request is input will be described below in detail, and the data specified by the data identification information is acquired on the authority given to the user specified by the user identification information, and the acquired data is stored in the first storage unit 340.

In step S76, the data output by the task controlling task is acquired, and the processing proceeds to step S77. Specifically, the personal task reads the data specified by the data identification information received in step S74 from among the data stored in the first storage unit 340. In step S77, the image of the acquired data is arranged in the personal display region of the personal task image, and the processing proceeds to step S78.

In step S78, a determination is made as to whether the user's drag operation is received. Specifically, when a position in the image arranged in step S77 is continuously detected by the touch panel 130 for a predetermined time, the personal task receives the drag operation. When the drag operation is received, the processing proceeds to step S79, and otherwise the processing proceeds to step S80.

In step S79, an image arrangement update processing is performed, and the processing proceeds to step S82. The image arrangement update processing will be described below in detail, and the image arrangement update processing is to determine an authority of data corresponding to an image when the image arranged in the personal display region is moved and is further moved to an authority setting region.

In step S80, the personal task determines whether an access to the data stored in the first storage unit 340 is received. Specifically, the personal task determines whether an operation of designating data to be accessed among the data stored in the first storage unit 340 and an operation of designating a processing to be performed on the data are received. For example, when a position in the image arranged in the personal display region is detected by the touch panel 130, the operation of designating the data corresponding to the image including the position detected by the touch panel 130 from among the data stored in the first storage unit 340 is received. Further, when a series of processing to be performed is displayed with a plurality of processing names in a pulldown menu and any position in the processing names is detected by the touch panel 130, the operation of designating the processing corresponding to the processing name arranged at the position detected by the touch panel 130 is received. When the personal task receives the access, the processing proceeds to step S81, and otherwise the processing proceeds to step S82.

In step S81, the processing designated in step S80 is performed on the data designated in step S80 among the data stored in the first storage unit 340, and the processing proceeds to step S82. In step S82, a determination is made as to whether logout of a user is detected. Specifically, when an image of a corresponding user is not present in the images shot and output by the cameras 140A to 140D, logout of the user is detected. When logout of the user is detected, the processing proceeds to step S83, and otherwise the processing returns to step S74.

In step S83, the logout information is output to the task controlling task, and the processing ends. The logout information includes the position information for specifying a position in the common display region of the image arranged in the common display region, the data identification information of the data corresponding to the image arranged in the common display region, and the user identification information for specifying the user who has logged out.

Figure 18:
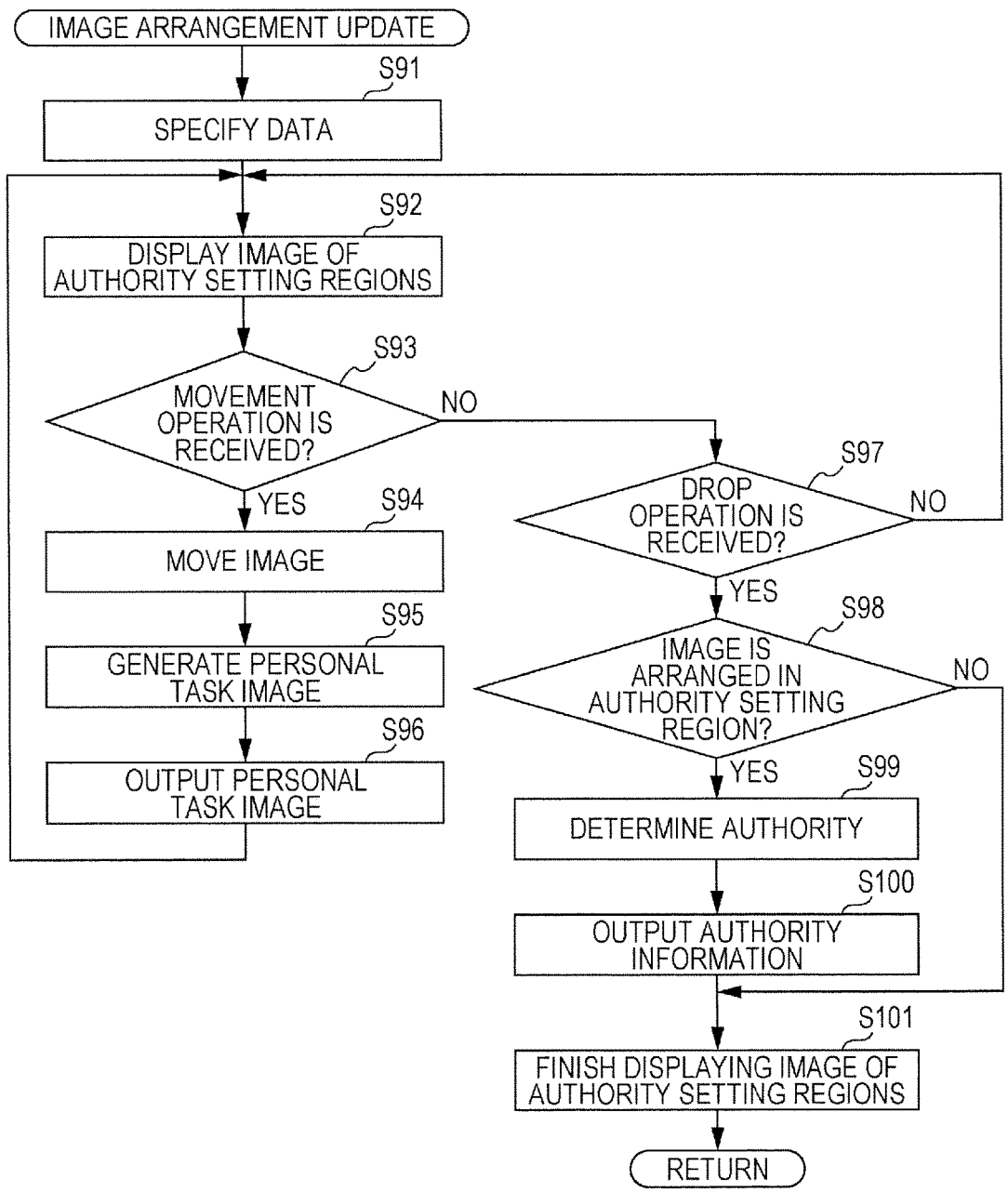
FIG. 18 is a flowchart illustrating an exemplary flow of an image arrangement update processing according to one or more embodiments of the present invention.

FIG. 18 is a flowchart illustrating an exemplary flow of the image arrangement update processing. The image arrangement update processing is performed in step S79 in the personal task execution processing illustrated in FIG. 17. With reference to FIG. 18, the personal task specifies data subjected to the drag operation, and the processing proceeds to step S92 (step S91). Specifically, the personal task specifies data corresponding to the image including the position detected by the touch panel 130 when receiving the drag operation.

In step S92, an image indicating one or more authority setting regions is displayed in the common display region of the personal task image, and the processing proceeds to step S93. In step S93, a determination is made as to whether the user's movement operation is received. Specifically, the movement operation is received when a position detected by the touch panel 130 changes over time. When the movement operation is received, the processing proceeds to step S94, and otherwise the processing proceeds to step S97.

In step S94, the image of the data specified in step S91 is moved within the personal task image according to a change in position detected by the movement operation, and the processing proceeds to step S95. In step S95, the personal task image is generated after the image is moved, and the processing proceeds to step S96. Thereby, the personal task image is updated. In step S96, the generated personal task image is output to the task controlling task, and the processing returns to step S92. The task controlling task displays the combined screen including the updated personal task image on the display unit 120.

In step S97, a determination is made as to whether the user's drop operation is received. Specifically, the drop operation is detected when the position which has been detected by the touch panel 130 is not detected. Thereby, the position of the moved image is defined in the updated personal task image, and the image is arranged at the position last detected by the touch panel 130. When the drop operation is received, the processing proceeds to step S98, and otherwise the processing returns to step S92.

In step S98, a determination is made as to whether the image on the reception of the drop operation is arranged in any of the one or more authority setting regions arranged in step S92. When the image on the reception of the drop operation is arranged in any of the one or more authority setting regions, the processing proceeds to step S99, and otherwise the processing returns to the personal task execution processing.

In step S99, the personal task determines an authority of the data specified in step S91, and the processing proceeds to step S100. Specifically, the authority corresponding to the authority setting region in which the image is arranged on the reception of the drop operation in step S97 among the one or more authority setting regions arranged in step S92 is determined as the authority for the data specified in step S91.

In step S100, authority information is output to the task controlling task, and the processing proceeds to step S101. The authority information includes the data identification information for specifying the data specified in step S91 and the authority determined in step S99. In step S101, the image indicating the one or more authority setting regions arranged in the common display region of the personal task image in step S92 finishes being displayed, and the processing returns to the personal task execution processing.

Returning to FIG. 16, in step S04, the task controlling task determines whether an activated personal task is present. When the task controlling task determines that an activated personal task is present, the processing proceeds to step S05, and otherwise the processing proceeds to step S10. In step S05, an image display processing is performed, and the processing proceeds to step S06.

Figure 19:
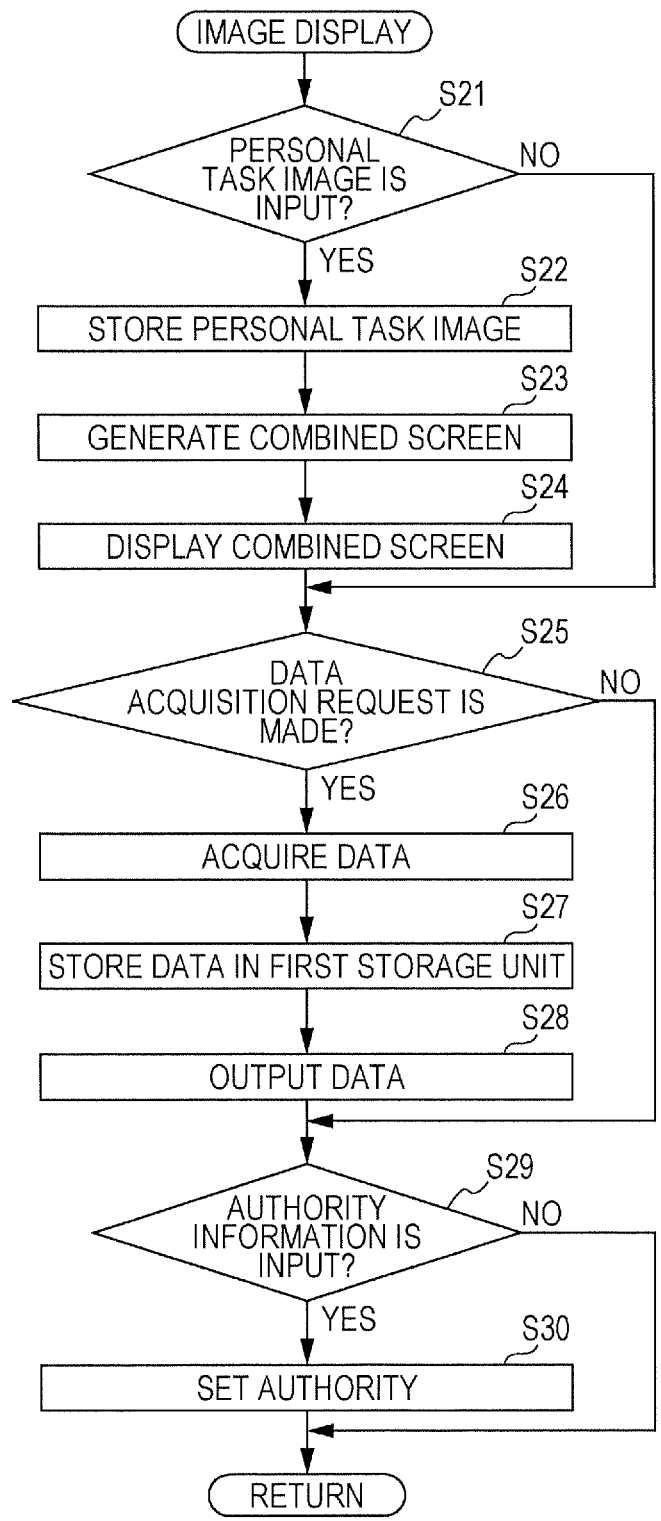
FIG. 19 is a flowchart illustrating an exemplary flow of an image display processing according to one or more embodiments of the present invention.

FIG. 19 is a flowchart illustrating an exemplary flow of the image display processing. The image display processing is performed in step S05 in the task control processing illustrated in FIG. 16. At least one personal task is activated before the image display processing is performed. With reference to FIG. 19, the task controlling task determines whether a personal task image is input from any one of the one or more activated personal tasks (step S21). When the task controlling task is input with a personal task image, the processing proceeds to step S22, and otherwise the processing proceeds to step S25. In step S22, the input personal task image is stored in the RAM 114 and the processing proceeds to step S23.

In step S23, when one or more task images are stored in the RAM 114 and a common image is stored in the RAM 114 in the combined screen update processing illustrated in FIG. 18 described below, the common image is combined therewith thereby to generate a combined screen, and the processing proceeds to step S24. The combined screen is generated such that the personal region images of the one or more personal task images do not overlap on each other and the common images of the one or more personal task images, and a common image if any overlap on each other.

In step S24, the combined screen generated in step S23 is displayed on the display unit 120, and the processing proceeds to step S25. For example, the task controlling task arranges the first personal region image 211A, the second personal region image 212A, the third personal region image 213A, and the fourth personal region image 214A in the first personal display region 121, the second personal display region 122, the third personal display region 123, and the fourth personal display region 124 in the display face of the display unit 120, respectively. Further, the task controlling task arranges the image in which the first common image 211B, the second common image 212B, the third common image 213B, the fourth common image 214B, and the common image 371 are combined in the common display region 125 in the display face of the display unit 120.

In step S25, a determination is made as to whether a data acquisition request is input from the one or more activated personal tasks. When the data acquisition request is input, the processing proceeds to step S26, and otherwise the processing proceeds to step S29. In step S26, the data specified by the data identification information included in the data acquisition request is acquired on the authority of the user specified by the user identification information included in the data acquisition request, and the processing proceeds to step S27. Specifically, the CPU 111 acquires the data specified by the data identification information from the HDD 116 when the data specified by the data identification information is stored in the HDD 116, controls the communication I/F unit 112 and acquires the data specified by the data identification information from an external information processing apparatus when the data is stored in the external information processing apparatus, and controls the external storage device 118 and acquires the data specified by the data identification information from the CD-ROM 118A when the data is stored in the CD-ROM 118A.

In step S27, the data acquired in step S26 is stored in the first storage unit 340 in association with the user identification information, and the processing proceeds to step S28. In step S28, the data stored in the first storage unit 340 is output to the personal task which has transmitted the data acquisition request, and the processing proceeds to step S29.

In step S29, a determination is made as to whether authority information is input from any of the one or more activated personal tasks. The authority information includes an authority determined by the personal task which has transmitted the authority information for data identification information and data specified by the data identification information. When the task controlling task is input with the authority information, the processing proceeds to step S30, and otherwise the processing returns to the task control processing. In step S30, the task controlling task sets the authority included in the authority information for the data specified by the data identification information included in the input authority information, and the processing returns to the task control processing.

Returning to FIG. 16, in step S06, the task controlling task determines whether logout information is input from any of the one or more activated personal tasks. When detecting logout of a corresponding user (YES in step S82 in FIG. 17), the one or more personal tasks output the logout information to the task controlling task, and thus the task controlling task determines whether the logout information is input therein. The logout information includes data identification information, position information, and user identification information. When the task controlling task is input with the logout information, the processing proceeds to step S07, and otherwise the processing returns to step S01. In step S07, the combined screen update processing is performed and the processing proceeds to step S08.

Figure 20:
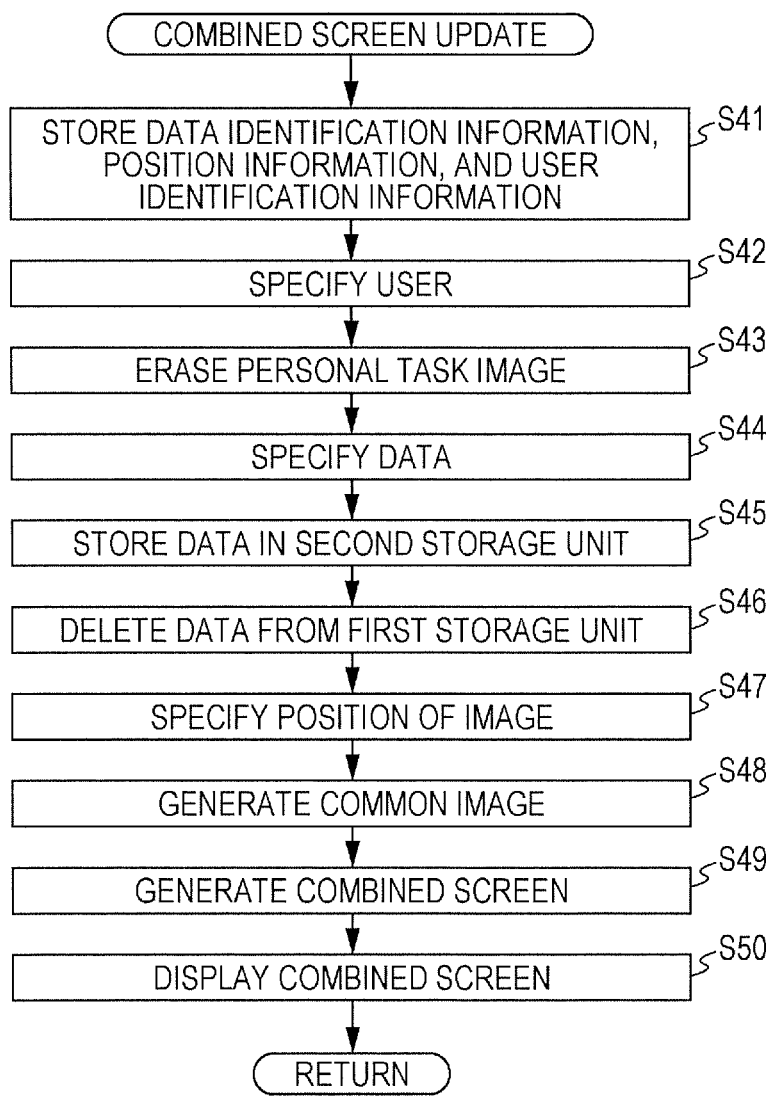
FIG. 20 is a flowchart illustrating an exemplary flow of a combined screen update processing according to one or more embodiments of the present invention.

FIG. 20 is a flowchart illustrating an exemplary flow of the combined screen update processing. The combined screen update processing is performed in step S07 in the task control processing illustrated in FIG. 16. The logout information is input from any of the one or more personal tasks before the task control processing is performed. With reference to FIG. 20, the task controlling task stores the data identification information, the position information, and the user identification information included in the logout information in the RAM 114 (step S41). In step S42, the task controlling task specifies the user who has logged out on the basis of the user identification information stored in the RAM 114 in step S41, and the processing proceeds to step S43. In step S43, the personal task image generated by the personal task corresponding to the user specified in step S42 is erased from the combined screen, and the processing proceeds to step S44.

In step S44, the data is specified on the basis of the data identification information stored in the RAM 114 in step S41, and the processing proceeds to step S45. Specifically, the CPU 111 specifies the data specified by the data identification information stored in the RAM 114 among the data stored in the first storage unit 340. In other words, the data corresponding to the image arranged in the common display region 125 of the personal task image generated by the personal task corresponding to the user who has logged out is specified.

In step S45, the data specified in step S44 is stored in the second storage unit 360 in association with the position information and the user identification information, and the processing proceeds to step S46. In step S46, the data specified by the data identification information stored in the RAM 114 in step S41 is deleted from the data stored in the first storage unit 340, and the processing proceeds to step S47. In other words, the same data as the data stored in the second storage unit 360 in step S45 is deleted from the first storage unit 340.

In step S47, a position in the display face of the display unit 120 is specified on the basis of the position information stored in the RAM 114 in step S41, and the processing proceeds to step S48. In step S48, the image of the data specified in step S44 is arranged at the position specified in step S47 thereby to generate a common image, and the processing proceeds to step S49.

In step S49, a combined screen is generated, and the processing proceeds to step S50. Specifically, the common image generated in step S48, and the one or more personal task images stored in the RAM 114 in step S22 in the image display processing illustrated in FIG. 19 are combined thereby to generate a new combined screen. In step S50, the generated combined screen is displayed on the display unit 120, and the processing returns to the task control processing.

Returning to FIG. 16, in step S08, the task controlling task determines whether an access to the data stored in the second storage unit 360 is received. Specifically, the task controlling task determines whether an operation of designating data to be accessed among the data stored in the second storage unit 360 and an operation of designating a processing to be performed on the data are received. For example, when a position in the image arranged in the common display region is continuously detected by the touch panel 130 for a predetermined time and the data corresponding to the image including the position detected by the touch panel 130 is stored in the second storage unit 360, the operation of designating the data is received. Further, when a series of processing to be performed is indicated by a plurality of processing names in a pulldown menu and any position in the processing names is detected by the touch panel 130, the operation of designating the processing corresponding to the processing name arranged at the position detected by the touch panel 130 is received. When the task controlling task receives the access, the processing proceeds to step S09, and otherwise the processing returns to step S01. In step S09, a data operation processing is performed, and the processing returns to step S01.

Figure 21:
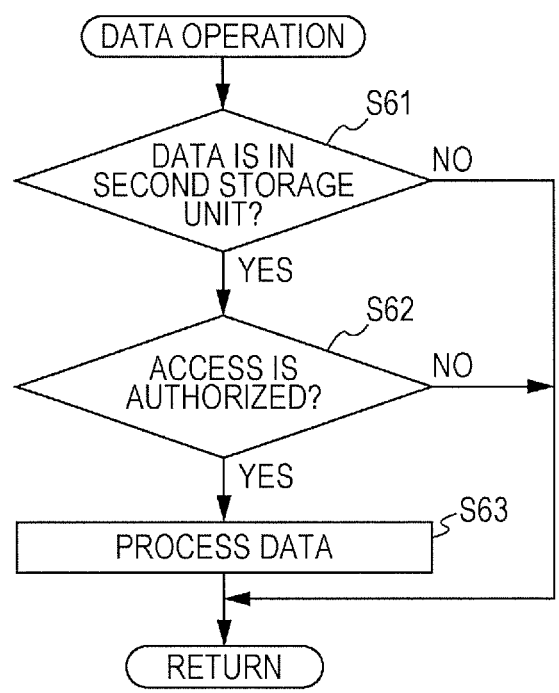
FIG. 21 is a flowchart illustrating an exemplary flow of a data operation processing according to one or more embodiments of the present invention.

FIG. 21 is a flowchart illustrating an exemplary flow of the data operation processing. The data operation processing is performed in step S09 in the task control processing illustrated in FIG. 16. An access to the data is received and the data identification information of the data to be accessed and the processing to be performed on the data are determined before the data operation processing is performed. With reference to FIG. 21, the task controlling task determines whether data is stored in the second storage unit 360 (step S61). When the data to be accessed is stored in the second storage unit 360, the processing proceeds to step S62, and otherwise the processing returns to the task control processing.

In step S62, a determination is made as to whether an authority to perform a processing determined before the data operation processing is performed on the data specified in step S61 is given. When the task controlling task determines that the authority to perform a processing on the data to be accessed is given, the processing proceeds to step S63, and otherwise the processing returns to the task control processing. In step S63, the task controlling task performs the determined processing on the data specified by the data identification information among the data stored in the second storage unit 360, and the processing returns to the task control processing.

Returning to FIG. 16, the processing proceeds to step S10 when no personal task is present. In this case, if one or more personal tasks were activated in the past, data may be stored in the second storage unit 360. In step S10, the task controlling task determines whether data is stored in the second storage unit 360. When data is stored in the second storage unit 360, the processing proceeds to step S11, and otherwise the processing returns to step S01.

In step S11, as in step S08, a determination is made as to whether an access to the data stored in the second storage unit 360 is received. When the access is received, the processing proceeds to step S12, and otherwise the processing proceeds to step S14. In step S12, a determination is made as to whether an authority to access the data via the access received in step S11 is given. The task controlling task determines whether the processing specified by the access can be performed on the authority stored in association with the data specified via the access received in step S11. When the task controlling task determines that the authority to access is given, the processing proceeds to step S13, and otherwise the processing proceeds to step S14.

In step S13, the processing specified via the access received in step S11 is performed on the data specified via the access received in step S11 among the data stored in the second storage unit 360, and the processing proceeds to step S14.

In step S14, a determination is made as to whether the effective period has elapsed after all the users logged out. When the effective period has elapsed, the processing proceeds to step S15, and otherwise the processing returns to step S11. In the case of YES in step S10, the task controlling task determines that all the users logged out. In step S15, the task controlling task deletes the data stored in the second storage unit 360, and the processing ends.

With reference to FIG. 4, the present example is such that the data to be processed by the first personal task execution unit 200A, the second personal task execution unit 200B, the third personal task execution unit 200C, and the fourth personal task execution unit 200D is acquired by the task control unit 300 and stored in the first storage unit 340. Instead, the first personal task execution unit 200A, the second personal task execution unit 200B, the third personal task execution unit 200C, and the fourth personal task execution unit 200D acquire the data to be processed thereby to generate the first personal task image, the second personal task image, the third personal task image, and the fourth personal task image, respectively. In this case, the first personal task execution unit 200A, the second personal task execution unit 200B, the third personal task execution unit 200C, and the fourth personal task execution unit 200D have the task-based data acquisition unit 330 and the first storage unit 340.

As described above, the MFP 100 according to the present example functions as an information processing apparatus, finishes displaying the image Doc3 arranged in the second personal display region 122 in the second personal task image 212 among the data acquired on the authority to access of the user C when the user B logs out, for example, while the user A, the user B, and the user C are logging in, and continues to display the image Doc2 arranged in the common display region 125. Thus, the user B arranges the image Doc2 of the data acquired on his/her authority to access in the common display region so that the user B may permit other user to access the data corresponding to the image Doc2, and does not arrange the image Doc3 of the data acquired on his/her authority to access in the common display region so that the user B may not permit other user to access the data corresponding to the image Doc3. The user A and the user C who have not logged out can browse the data corresponding to the image Doc3 and acquired on the authority to access of the user B who has logged out.

The CPU 111 provided in the MFP 100 forms three personal tasks corresponding to the logged-in user A, user B, and user C, and the task controlling task for controlling the three personal tasks, each of the three personal tasks generates a personal task image for each of the user A, the user B, and the user C, and moves an image of data arranged in the personal display region of the personal task image in the display face of the display unit 120 on the basis of an operation received by the touch panel 130, and for example, when the user B logs out, the task controlling task generates a common image in which the image Doc2 arranged in the common display region 125 out of the images Doc2 and Doc3 of the data acquired on the authority to access of the user B who has logged out is arranged in the common display region 125, and displays a combined screen in which the first personal task image and the third personal task image corresponding to the logged-in user A and user B are combined with the common image on the display unit 120. Thus, the common image in which the image Doc2 of the data acquired on the authority to access of the user B who has logged out is arranged in the common display region 125 is displayed, and thus the logged-in user A and user C can be permitted to access the data acquired on the authority to access of the user B who has logged out.

When the user B logs out, the task controlling task reads the data corresponding to the image in which a corresponding image among the data acquired on the authority to access of the user B is moved to the common display region 125 from the first storage unit 340, and stores it in the second storage unit 360. Thus, the logged-in user A and user C can access the data acquired on the authority to access of the user B who has logged out.

The task controlling task sets an authority to restrain an access to the data stored in the second storage unit 360. Thus, the user B who has logged out can restrain the logged-in user A and user C from accessing the data acquired on his/her authority to access.

Each of the three personal tasks displays the three authority setting regions 241, 242, and 243 corresponding to one or more authorities different in restraint contents in the common display region 125, and determines an authority corresponding to an authority setting region including a position to which the image is moved among the authority setting regions 241, 242, and 243 for the data corresponding to the moved image. Therefore, the authority to be given to the data corresponding to the image arranged in the common display region 125 can be set by the drag operation, the movement operation, and the drop operation for moving the image, and the authority setting operation is facilitated.

The data corresponding to the image Doc2 arranged in the common display region 125 is deleted when the effective period elapses after all of the user A, the user B, and the user C log out, thereby preventing the data from being diffused.

According to one or more embodiments, when the effective period elapses after all of the user A, the user B, and the user C log out, the data stored in the second storage unit 360, specifically the data corresponding to the image Doc2 is deleted, but the data stored in the second storage unit 360 may not be deleted. In this case, the deletion unit 430 is not required. Further, in this case, the authority given to the data stored in the second storage unit 360 may have different restraint contents between before and after all of the use A, the user B, and the user C log out. The series of processing capable of being performed on the data can be different between while the conference is being held and after the conference ends. For example, the data is authorized to edit only during the conference and the data is not authorized to edit after the end of the conference, thereby preventing the data from being changed after the end of the conference.

The embodiments have been described by way of the MFP 100 as exemplary information processing apparatus, but the invention can be assumed as the conference support method for causing the MFP 100 to perform the series of processing illustrated in FIGS. 16 to 21, or the conference support program for causing the CPU 111 provided in the MFP 100 to perform the conference support method.

<Notes>

(1) The information processing apparatus according to a seventh aspect, wherein when a personal task execution unit which moves an image to the common display region among the personal task execution units completes the movement of the image to the common display region, the common image generation unit arranges an image of data corresponding to the image moved to the common display region among the data acquired by the task-based data acquisition unit in the common image, and the personal task execution unit which moves the image to the common display region among the personal task execution units displays the image until the movement unit completes the movement of the image to the common display region, and finishes displaying the image when the movement of the image to the common display region by the movement unit is completed.

(2) The information processing apparatus according to an eighth aspect, wherein when an image arranged in the common image is moved to the personal display region on the basis of an operation received by the operation unit after the movement of the image to the common display region is completed, the personal task execution units arrange an image of data corresponding to the image moved to the personal display region among the data acquired by the task-based data acquisition unit in the personal display region.

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include all modifications within the same meaning and range as those of equivalents of the appended claims.

What is claimed is:

1. An information processing apparatus to which a plurality of users can log in, comprising:
   a display that displays an image;
   a touch panel that receives a user operation; and
   a processor that causes the display to display:
      personal region images corresponding to the respective users in a plurality of personal display regions at different positions in a display face of the display, and
      common images in the same common display region among the users in the display face of the display, wherein
   the processor causes the display to display an image of data acquired on the authority to access of a corresponding user as at least one of the personal region images in one of the personal display regions to be movable, and
   when any of the users logs out, the processor finishes displaying the image arranged in one of the personal display regions among the data acquired on the authority to access of the user who logs out, and continues to display the image arranged in the common display region, the processor executes, in response to a corresponding user logging in, a process comprising:
generating a personal task image including the personal display region and the common display region for each of the users and in which an image of data acquired on the authority to access of a corresponding user is arranged in the personal display region; and
moving an image of data arranged in each of the personal display regions in the display face of the display based on an operation received by the touch panel, and
the processor generates, when any of the users logs out, a common image in which the image arranged in the personal display region among the images of the data acquired on the authority to access of the user who logs out is arranged in the common display region,
the processor displays a combined screen in which one or more personal task images generated by the processing corresponding to one or more logged-in users are combined with the common image on the display,
the processor acquires, when one of the users logs out, data corresponding to an image moved to the common display region by the process corresponding to the logged-out user,
the processor sets an authority to restrain an access to the acquired data,
the processor restrains an access to the acquired data based on an operation received by the touch panel according to the set authority,
the process further comprises:
displaying one or more authority setting regions corresponding to one or more authorities different in restraint contents, respectively, in the common display region,
when an image arranged in the personal display regions is moved to any of one or more authority setting regions, determining an authority corresponding to an authority setting region including a position to which the image is moved in the one or more authority setting regions for the data corresponding to the moved image, and
the processor sets the determined authority for the acquired data.

2. The information processing apparatus according to claim 1,
wherein the one or more authorities include authorities different in restraint contents between before and after all the users log out.

3. The information processing apparatus according to claim 1,
wherein the processor further deletes the acquired data when an effective period elapses after all the users log out.

4. The information processing apparatus according to claim 1,
wherein the processor further acquires data corresponding to an image arranged in the personal display region by the process, and
the processor acquires the data acquired in order for the process corresponding to a log-out user to arrange an image in the personal display region.

5. The information processing apparatus according to claim 1, wherein the authority setting regions receive setting of the authorities while the touch panel receives the operation to move the image of data arranged in each of the personal display regions to the common display region.

6. A conference support method executed by a processor of an information processing apparatus to which a plurality of users can log in, the information processing apparatus including a display and a touch panel, the method comprising:
displaying personal task images corresponding to the respective users in a plurality of personal display regions at different positions in a display face of the display, and displaying common images in the same common display region among the users in the display face of the display;
displaying an image of data acquired on the authority to access of a corresponding user as at least one of the personal region images in one of the personal display regions to be movable; and
when any of the users logs out, finishing displaying the image arranged in one of the personal display regions among the data acquired on the authority to access of the user who logs out, and continuing to display the image arranged in the common display region,
executing, in response to a corresponding user logging in, a process comprising:
generating a personal task image including the personal display region and the common display region for each of the users and in which an image of data acquired on the authority to access of a corresponding user is arranged in the personal display region; and
moving an image of data arranged in each of the personal display regions in the display face of the display on the basis of an operation received by the touch panel, and
when any of the users logs out, generating a common image in which the image arranged in the personal display region among the images of the data acquired on the authority to access of the user who logs out is arranged in the common display region; and
displaying a combined screen in which one or more personal task images generated by the processing corresponding to one or more logged-in users are combined with the common image on the display,
acquiring, when one of the users logs out, data corresponding to an image moved to the common display region by the process corresponding to the logged-out user,
setting an authority to restrain an access to the acquired data,
restraining an access to the acquired data based on an operation received by the touch panel according to the set authority,
displaying one or more authority setting regions corresponding to one or more authorities different in restraint contents, respectively, in the common display region,
when an image arranged in the personal display regions is moved to any of one or more authority setting regions, determining an authority corresponding to an authority setting region including a position to which the image is moved in the one or more authority setting regions for the data corresponding to the moved image, and
setting the determined authority for the acquired data.

7. The conference support method according to claim 6, wherein the authority setting regions receive setting of the authorities while the touch panel receives the operation to move the image of data arranged in each of the personal display regions to the common display region.

8. A non-transitory recording medium storing a computer readable conference support program which is executed by a processor of an information processing apparatus to which a plurality of users can log, the information processing apparatus including a display and a touch panel, the program causing the processor to execute:

displaying personal task images corresponding to the respective users in a plurality of personal display regions at different positions in a display face of the display, and displaying common images in the same common display region among the users in the display face of the display;

displaying an image of data acquired on the authority to access of a corresponding user as at least one of the personal region images in one of the personal display regions to be movable; and when any of the users logs out, finishing displaying the image arranged in one of the personal display regions among the data acquired on the authority to access of the user who logs out, and continuing to display the image arranged in the common display region, executing, in response to a corresponding user logging in, a process comprising:

generating a personal task image including the personal display region and the common display region for each of the users and in which an image of data acquired on the authority to access of a corresponding user is arranged in the personal display region; and moving an image of data arranged in each of the personal display regions in the display face of the display on the basis of an operation received by the touch panel, and when any of the users logs out, generating a common image in which the image arranged in the personal display region among the images of the data acquired on the authority to access of the user who logs out is arranged in the common display region; and displaying a combined screen in which one or more personal task images generated by the processing corresponding to one or more logged-in users are combined with the common image on the display, acquiring, when one of the users logs out, data corresponding to an image moved to the common display region by the process corresponding to the logged-out user, setting an authority to restrain an access to the acquired data, restraining an access to the acquired data based on an operation received by the touch panel according to the set authority, displaying one or more authority setting regions corresponding to one or more authorities different in restraint contents, respectively, in the common display region, when an image arranged in the personal display regions is moved to any of one or more authority setting regions, determining an authority corresponding to an authority setting region including a position to which the image is moved in the one or more authority setting regions for the data corresponding to the moved image, and setting the determined authority for the acquired data.

9. The non-transitory recording medium according to claim 8, wherein the authority setting regions receive setting of the authorities while the touch panel receives the operation to move the image of data arranged in each of the personal display regions to the common display region.

* * * * *